US006901420B2

(12) United States Patent
Lin et al.

(10) Patent No.: US 6,901,420 B2
(45) Date of Patent: *May 31, 2005

(54) METHOD AND APPARATUS FOR PERFORMING PACKED SHIFT OPERATIONS

(75) Inventors: Derrick Chu Lin, Foster City, CA (US); Punit Minocha, Sunnyvale, CA (US); Alexander D. Peleg, Haifa (IL); Yaakov Yaari, Haifa (IL); Millind Mittal, Palo Alto, CA (US); Larry M. Mennemeier, Boulder Creek, CA (US); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/623,062

(22) Filed: Jul. 18, 2003

(65) Prior Publication Data

US 2004/0024800 A1 Feb. 5, 2004

Related U.S. Application Data

(63) Continuation of application No. 09/747,122, filed on Dec. 22, 2000, now Pat. No. 6,631,389, which is a continuation of application No. 08/610,495, filed on Mar. 4, 1996, now Pat. No. 6,275,834, which is a continuation-in-part of application No. 08/349,730, filed on Dec. 1, 1994, now abandoned.

(51) Int. Cl.[7] ............................................... G06F 5/01
(52) U.S. Cl. ........................................ 708/209; 712/223
(58) Field of Search ......................... 708/209; 712/223

(56) References Cited

U.S. PATENT DOCUMENTS 3,711,692 A 1/1973 Batcher
3,723,715 A 3/1973 Chen et al.
4,139,899 A 2/1979 Tulpule et al.
4,161,784 A 7/1979 Cushing et al.
4,393,468 A 7/1983 New
4,418,383 A 11/1983 Doyle et al.
4,498,177 A 2/1985 Larson
4,707,800 A 11/1987 Montrone et al.

(Continued)

OTHER PUBLICATIONS

Case, B., "Philips Hopes to Displace DSPs with VLIW, TriMedia Processors Aimed at Future Multimedia Embedded Apps," Microprocessor Report, Dec. 1994, pp. 12–15.
Errata to MC88110 Second Generation RISC Microprocessor User's Manual, Motorola, Inc., 1992, pp. 1–11.
Gwennap, L., "New PA–RISC Processor Decodes MPEG Video, H"'s PA–7100LC Uses New Instructions to Eliminate Decoder Chip, Microprocessor Report, Jan. 1994, pp. 16–17.
i860 TM. Microprocessor Family Programmer's Reference Manual, Intel Corporation, 1992, Chapters 1, 3, 8, and 12.
Intel i750, i860 TM, i960 Processors and Related Products, 1993, pp. 1–3.

(Continued)

*Primary Examiner*—D. H. Malzahn
(74) *Attorney, Agent, or Firm*—Larry Mennemeier

(57) ABSTRACT

A method and apparatus for performing a shift operation on a packed data element having multiple values. The apparatus having multiple muxes, each of the multiple muxes having a first input, a second input, a select input and an output. Each of the multiple bits that represent a shifted packed intermediate result on a first bus is coupled to the corresponding first input. Each of the multiple bits representing a replacement bit for one of the multiple values is coupled to a corresponding second input. Each of the multiple bits driven by a correction circuit is coupled to a corresponding select input. Each output corresponds to a bit of a shifted packed result.

29 Claims, 19 Drawing Sheets

U.S. PATENT DOCUMENTS

| | | |
|---|---|---|
| 4,771,379 A | 9/1988 | Ando et al. |
| 4,903,228 A | 2/1990 | Gregoire et al. |
| 4,963,867 A | 10/1990 | Bertrand |
| 4,989,168 A | 1/1991 | Kuroda et al. |
| 5,081,698 A | 1/1992 | Kohn |
| 5,095,457 A | 3/1992 | Jeong |
| 5,168,571 A | 12/1992 | Hoover et al. |
| 5,187,679 A | 2/1993 | Vassiliadis et al. |
| 5,237,701 A | 8/1993 | Bertrand |
| 5,268,995 A | 12/1993 | Diefendorff et al. |
| 5,390,135 A | 2/1995 | Lee et al. |
| 5,408,670 A | 4/1995 | Davies |
| 5,416,731 A | 5/1995 | Dang et al. |
| 5,423,010 A | 6/1995 | Mizukami |
| 5,426,783 A | 6/1995 | Norrie et al. |
| 5,465,374 A | 11/1995 | Dinkjian et al. |
| 5,477,543 A | 12/1995 | Purcell |
| 5,481,746 A | 1/1996 | Schiffleger et al. |
| 5,487,159 A | 1/1996 | Byers et al. |
| 5,553,010 A | 9/1996 | Tanihira et al. |
| 5,594,437 A | 1/1997 | O'Malley |
| 5,625,374 A | 4/1997 | Turkowski |
| 5,666,298 A | 9/1997 | Peleg et al. |
| 5,680,161 A | 10/1997 | Lehman et al. |
| 5,781,457 A | 7/1998 | Cohen et al. |
| 5,818,739 A | 10/1998 | Peleg et al. |
| 5,831,877 A | 11/1998 | Thompson |
| 5,848,286 A | 12/1998 | Schiffleger et al. |
| 6,098,162 A | 8/2000 | Schiffleger et al. |

OTHER PUBLICATIONS

Kawakami, Y., et al., "A Single–Chip Digital Signal Processor for Voiceband Applications," IEEE, 1980 International Solid–State Circuits Conference, pp. 40–41.

Lee, R.B., "Accelerating Multimedia with Enhanced Microprocessors," IEEE Micro, Apr. 1995, pp. 22–32.

Margulis, N., "i860 Microprocessor Architecture," McGraw Hill, Inc., 1990, Chapters 6, 7, 8, 10, and 11.

MC88110 Programmer's Reference Guide, Motorola, Inc., 1992, pp. 1–4.

MC88110 Second Generation–RISC Microprocessor User's Manual, Motorola, Inc., Sep. 1992, pp. 1–1 through 2–23, pp. 2–1 through 2–20, 3–1 through 3–32, 5–1 through 5–25, 10–62 through 10–71, Index 1 through 17.

Motorola, MC88110 Second Generation RISC Microprocessor User's Manual, Motorola, Inc., 1991.

Pentium Processor's User's Manual, vol. 3: Architecture and Programming Manual, Intel Corporation, 1993, Chapters 1, 3, 4, 6, 8 and 18.

Shipnes, J., "Graphics Processing with the 88110 RISC Microprocessor," Motorola, Inc., IEEE, No. 0–8186–26455–0/92, 1992, pp. 169–174.

TMS320c2X, User's Guide, Digital Signal Processing Products, Texas Instruments, 1993, pp. 3–2—3–11; 3–28—3–34; 4–1—4–22; 4–41; 4–103; 4–119; 4–120; 4–122; 4–150; 4–151.

UltraSPARC Multimedia Capabilities On–Chip Support for Real0–Time Video and Advanced Graphics; SPARC Technology Business, Sep. 1994, Sun Microsystems, Inc.

| 63 | 55 54 | 47 46 | 39 38 | 31 30 | 22 | 15 14 | 7 6 | 0 |
|---|---|---|---|---|---|---|---|---|
| bbbb bbbb | bbbb bbbb | bbbb bbbb | bbbb bbbb | bbbb bbbb | | bbbb bbbb | bbbb bbbb | bbbb bbbb |

Unsigned Packed Byte In-register Representation 510

| 63 | 55 54 | 47 46 | 39 38 | 31 30 | 22 | 15 14 | 7 6 | 0 |
|---|---|---|---|---|---|---|---|---|
| sbbb bbbb | sbbb bbbb | sbbb bbbb | sbbb bbbb | sbbb bbbb | | sbbb bbbb | sbbb bbbb | sbbb bbbb |

Signed Packed Byte In-register Representation 511

FIG. 5B

| 63 | 47 46 | 31 30 | 15 14 | 0 |
|---|---|---|---|---|
| wwww wwwww wwww | wwww wwwww wwww | wwww wwwww wwww | wwww wwwww wwww |

Unsigned Packed Word In-register Representation 512

| 63 | 47 46 | 31 30 | 15 14 | 0 |
|---|---|---|---|---|
| swww wwwww wwww | swww wwwww wwww | swww wwwww wwww | swww wwwww wwww |

Signed Packed Word In-register Representation 513

FIG. 5C

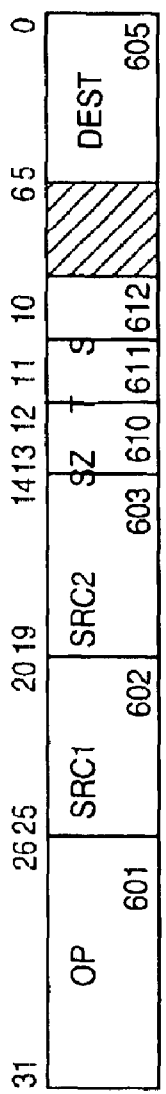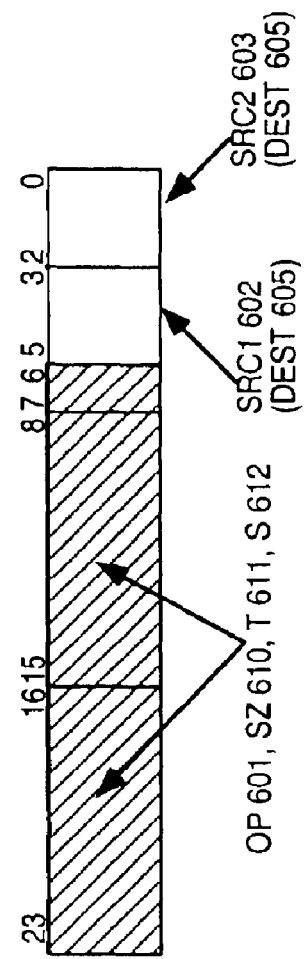
FIG. 6A
FIG. 6B

METHOD AND APPARATUS FOR PERFORMING PACKED SHIFT OPERATIONS

RELATED APPLICATIONS

This is a continuation of application Ser. No. 09/747,122, filed Dec. 22, 2000, now U.S. Pat. No. 6,631,389; which is a continuation of application Ser. No. 08/610,495 filed Mar. 4, 1996, now U.S. Pat. No. 6,275,834; which is a continuation-in-part if application Ser. No. 08/349,730 filed Dec. 1, 1994, now abandoned.

BACKGROUND OF THE INVENTION

1. Field of the Invention

In particular, the present invention describes an apparatus for performing arithmetic operations using a single control signal to manipulate multiple data elements. The present invention allows execution of shift operations on packed data types.

2. Description of Related Art

Today, most personal computer systems operate with one instruction to produce one result. Performance increases are achieved by increasing execution speed of instructions and the processor instruction complexity; known as Complex Instruction Set Computer (CISC). Such processors as the Intel 80286™ microprocessor, available from Intel Corp. of Santa Clara, Calif., belong to the CISC category of processor.

Previous computer system architecture has been optimized to take advantage of the CISC concept. Such systems typically have data buses thirty-two bits wide. However, applications targeted at computer supported cooperation (CSC—the integration of teleconferencing with mixed media data manipulation), 2D/3D graphics, image processing, video compression/decompression, recognition algorithms and audio manipulation increase the need for improved performance. But, increasing the execution speed and complexity of instructions is only one solution.

One common aspect of these applications is that they often manipulate large amounts of data where only a few bits are important. That is, data whose relevant bits are represented in much fewer bits than the size of the data bus. For example, processors execute many operations on eight bit and sixteen bit data (e.g., pixel color components in a video image) but have much wider data busses and registers. Thus, a processor having a thirty-two bit data bus and registers, and executing one of these algorithms, can waste up to seventy-five percent of its data processing, carrying and storage capacity because only the first eight bits of data are important.

As such, what is desired is a processor that increases performance by more efficiently using the difference between the number of bits required to represent the data to be manipulated and the actual data carrying and storage capacity of the processor.

BRIEF DESCRIPTION OF THE DRAWINGS

FIG. 5b, FIG. 5c and FIG. 5d illustrate in-register packed data representations.

FIG. 6a illustrates a control signal format used in the computer system to indicate the use of packed data.

FIG. 6b illustrates a second control signal format that can be used in the computer system to indicate the use of packed data.

DETAILED DESCRIPTION

A processor having shift operations that operate on multiple data elements is described. In the following description, numerous specific details are set forth such as circuits, etc., in order to provide a thorough understanding of the present invention. In other instances, well-known structures and techniques have not been shown in detail in order not to unnecessarily obscure the present invention.

Definitions

To provide a foundation for understanding the description of the embodiments of the present invention, the following definitions are provided.

Bit X through Bit Y:
defines a subfield of binary number. For example, bit six through bit zero of the byte 001110102 (shown in base two) represent the subfield 1110102. The '2' following a binary number indicates base 2. Therefore, 10002 equals 810, while F16 equals 1510.

Rx: is a register. A register is any device capable of storing and providing data. Further functionality of a register is described below. A register is not necessarily part of the processor's package.

DEST: is a data address.

SRC1: is a data address.

SRC2: is a data address.

Result: is the data to be stored in the register addressed by DEST.

Source1: is the data stored in the register addressed by SRC1.

Source2: is the data stored in the register addressed by SRC2.

Computer System

Figure 1:
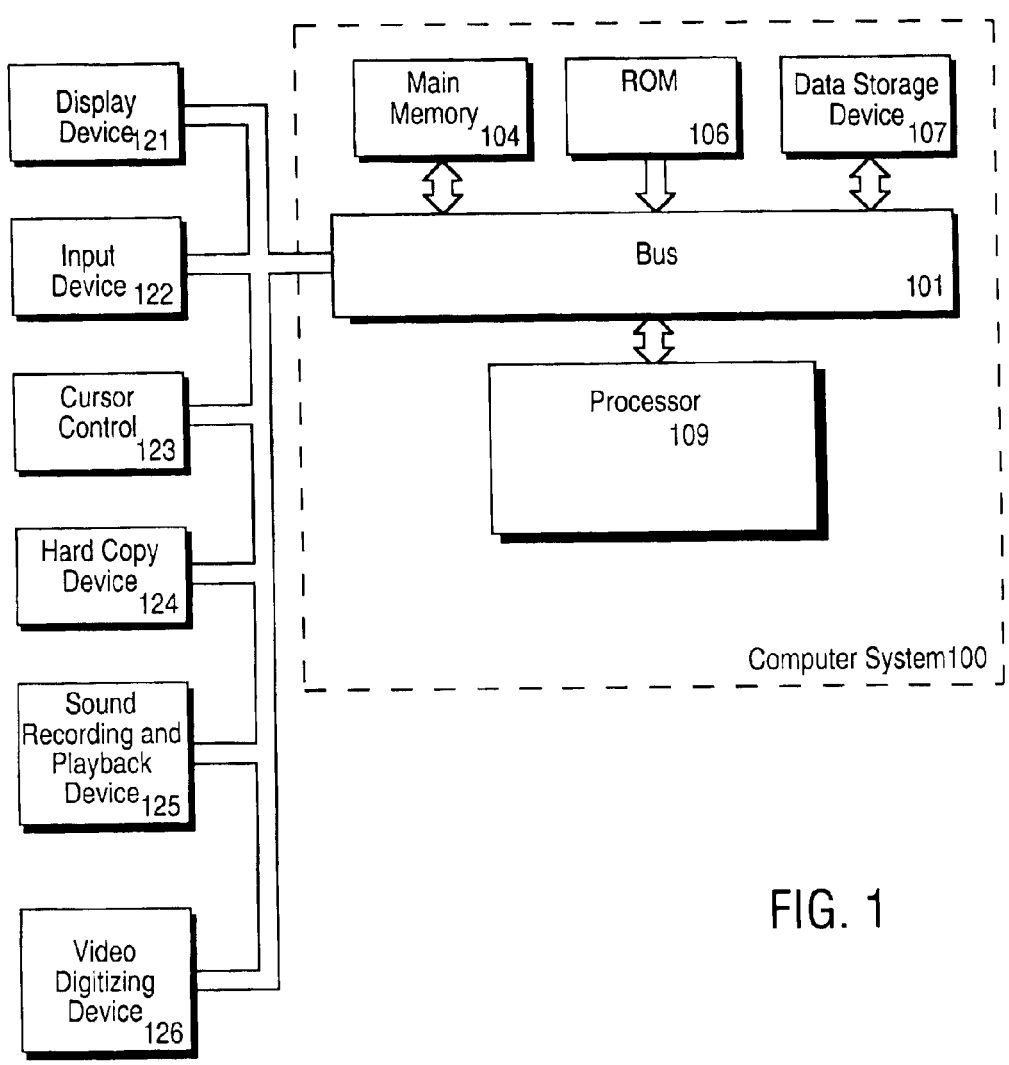
FIG. 1 illustrates an embodiment of the computer system using the apparatus of the present invention.

Referring to FIG. 1, a computer system upon which an embodiment of the present invention can be implemented is shown as computer system 100. Computer system 100 comprises a bus 101, or other communications hardware and software, for communicating information, and a processor 109 coupled with bus 101 for processing information. Computer system 100 further comprises a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions. Memory includes any data storage medium, such as main memory 104, cache memory, registers, ROM, and other static storage devices.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images that can be transmitted to others on the computer network.

Computer system 100 is useful for supporting computer supported cooperation (CSC—the integration of teleconferencing with mixed media data manipulation), 2D/3D graphics, image processing, video compression/decompression, recognition algorithms and audio manipulation.

Processor

Figure 2:
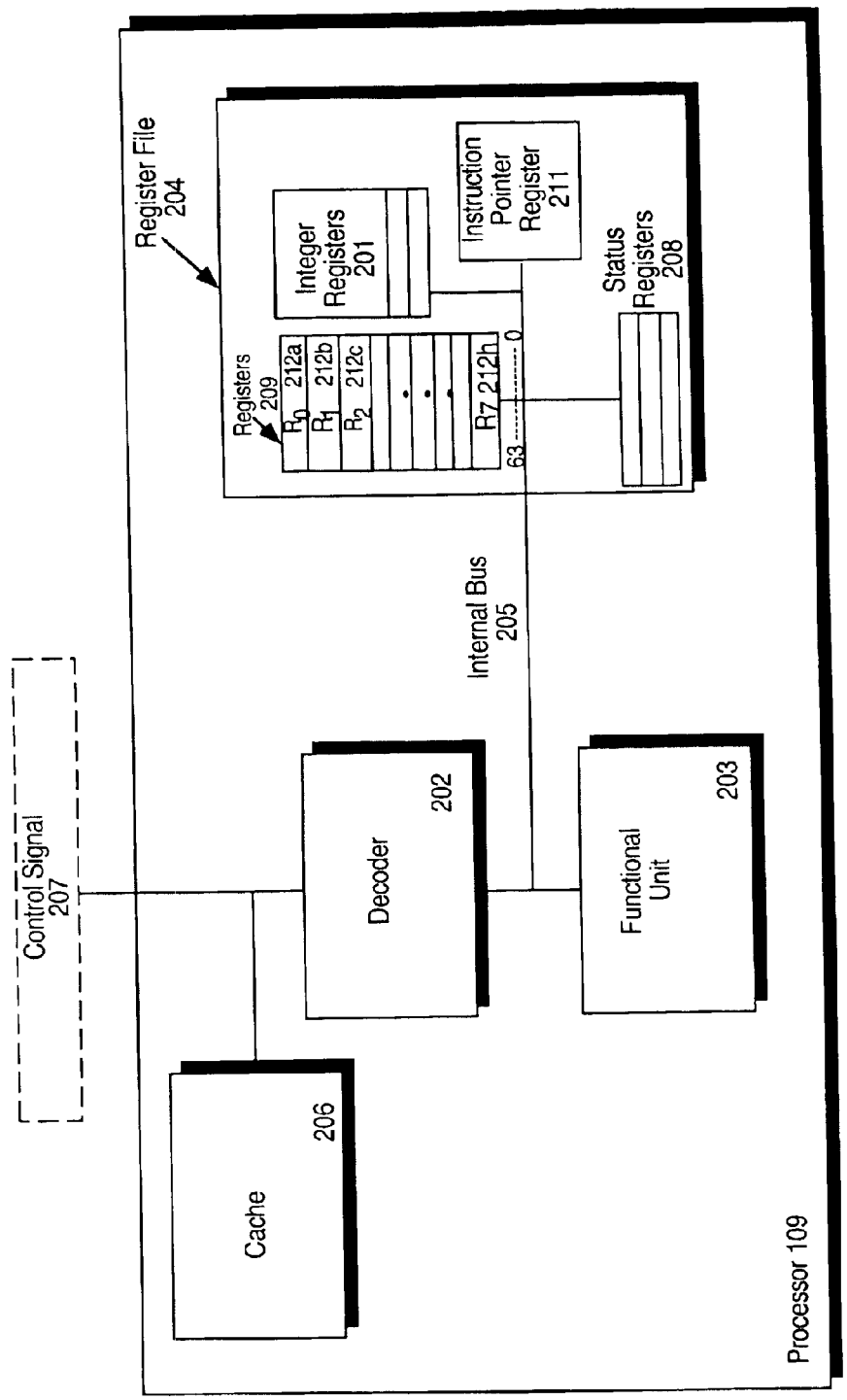
FIG. 2 illustrates an embodiment of the processor of the present invention.

FIG. 2 illustrates a detailed diagram of processor 109. Processor 109 can be implemented on one or more substrates using any of a number of process technologies, such as, BiCMOS, CMOS, and NMOS.

Processor 109 comprises a decoder 202 for decoding control signals and data used by processor 109. Data can then be stored in register file 204 via internal bus 205. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 201, registers 209, status registers 208, or instruction pointer register 211. Other registers can be included in the register file 204, for example, floating point registers. In one embodiment, integer registers 201 store thirty-two bit integer data. In one embodiment, registers 209 contains eight registers, $R_0$ 212a through $R_7$ 212h. Each register in registers 209 is sixty-four bits in length. $R_0$ 212a, $R_1$ 212b and $R_2$ 212c are examples of individual registers in registers 209. Thirty-two bits of a register in registers 209 can be moved into an integer register in integer registers 201. Similarly, a value in an integer register can be moved into thirty-two bits of a register in registers 209.

Status registers 208 indicate the status of processor 109. Instruction pointer register 211 stores the address of the next instruction to be executed. Integer registers 201, registers 209, status registers 208, and instruction pointer register 211 all connect to internal bus 205. Any additional registers would also connect to the internal bus 205.

In another embodiment, some of these registers can be used for two different types of data. For example, registers 209 and integer registers 201 can be combined where each register can store either integer data or packed data. In another embodiment, registers 209 can be used as floating point registers. In this embodiment, packed data can be stored in registers 209 or floating point data. In one embodiment, the combined registers are sixty-four bits in length and integers are represented as sixty-four bits. In this embodiment, in storing packed data and integer data, the registers do not need to differentiate between the two data types.

Functional unit 203 performs the operations carried out by processor 109. Such operations may include shifts, addition, subtraction and multiplication, etc. Functional unit 203 connects to internal bus 205. Cache 206 is an optional element of processor 109 and can be used to cache data and/or control signals from, for example, main memory 104. Cache 206 is connected to decoder 202, and is connected to receive control signal 207.

Figure 3:
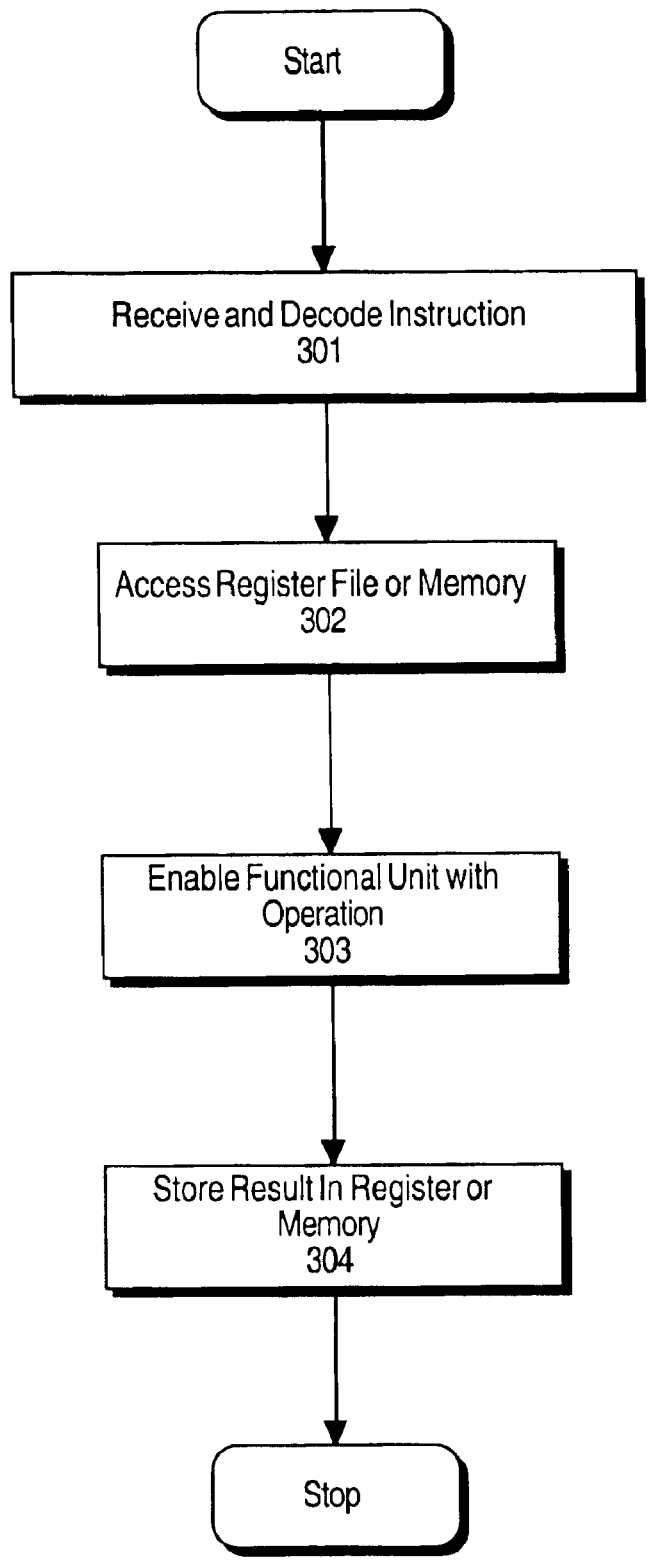
FIG. 3 is a flow diagram illustrating the general steps used by the processor to manipulate data in the register file.

FIG. 3 illustrates the general operation of processor 109. That is, FIG. 3 illustrates the steps followed by processor 109 while performing an operation on packed data, performing an operation on unpacked data, or performing some other operation. For example, such operations include a load operation to load a register in register file 204 with data from cache 206, main memory 104, read only memory (ROM) 106, or data storage device 107. In one embodiment of the present invention, processor 109 supports most of the instructions supported by the Intel 80486™, available from Intel Corporation of Santa Clara, Calif. In another embodiment of the present invention, processor 109 supports all the operations supported by the Intel 80486™, available from Intel Corporation of Santa Clara, Calif. In another embodiment of the present invention, processor 109 supports all the operations supported by the Pentium™ processor, the Intel 80486™ processor, the 80386™ processor, the Intel 80286™ processor, and the Intel 8086™ processor, all available from Intel Corporation of Santa Clara, Calif. In another embodiment of the present invention, processor 109 supports all the operations supported in the IA™—Intel Architecture, as defined by Intel Corporation of Santa Clara, Calif. (see Microprocessors, Intel Data Books volume 1 and volume 2, 1992 and 1993, available from Intel of Santa Clara, Calif.). Generally, processor 109 can support the present instruction set for the Pentium™ processor, but can also be modified to incorporate future instructions, as well as those described herein. What is important is that processor 109 can support previously used operations in addition to the operations described herein.

At step 301, the decoder 202 receives a control signal 207 from either the cache 206 or bus 101. Decoder 202 decodes the control signal to determine the operations to be performed.

Decoder 202 accesses the register file 204, or a location in another memory, at step 302. Registers in the register file 204, or memory locations in another memory, are accessed depending on the register address specified in the control signal 207. For example, for an operation on packed data, control signal 207 can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIG. 6a and FIG. 6b. The data stored in the corresponding registers is referred to as Source1, Source2, and Result respectively. Each of these data is sixty-four bits in length.

In another embodiment of the present invention, any one, or all, of SRC1, SRC2 and DEST, can define a memory location in the addressable memory space of processor 109. For example, SRC1 may identify a memory location in main memory 104 while SRC2 identifies a first register in integer registers 201, and DEST identifies a second register in registers 209. For simplicity of the description herein, references are made to the accesses to the register file 204, however, these accesses could be made to another memory instead.

In another embodiment of the present invention, the operation code only includes two addresses, SRC1 and SRC2. In this embodiment, the result of the operation is stored in the SRC1 or SRC2 register. That is SRC1 (or SRC2) is used as the DEST. This type of addressing is compatible with previous CISC instructions having only two addresses. This reduces the complexity in the decoder 202. Note, in this embodiment, if the data contained in the SRC1 register is not to be destroyed, then that data is copied into another register before the execution of the operation. The copying would require an additional instruction. To simplify the description herein, the three address addressing scheme will be described (i.e. SRC1, SRC2, and DEST). However, it should be remembered that the control signal, in one embodiment, may only include SRC1 and SRC2, and that SRC1 (or SRC2) identifies the destination register.

Where the control signal requires an operation, at step 303, functional unit 203 will be enabled to perform this operation on accessed data from register file 204. Once the operation has been performed in functional unit 203, at step 304, the result is stored back into register file 204 or another memory according to requirements of control signal 207.

Data Storage and Formats

Figure 4A:
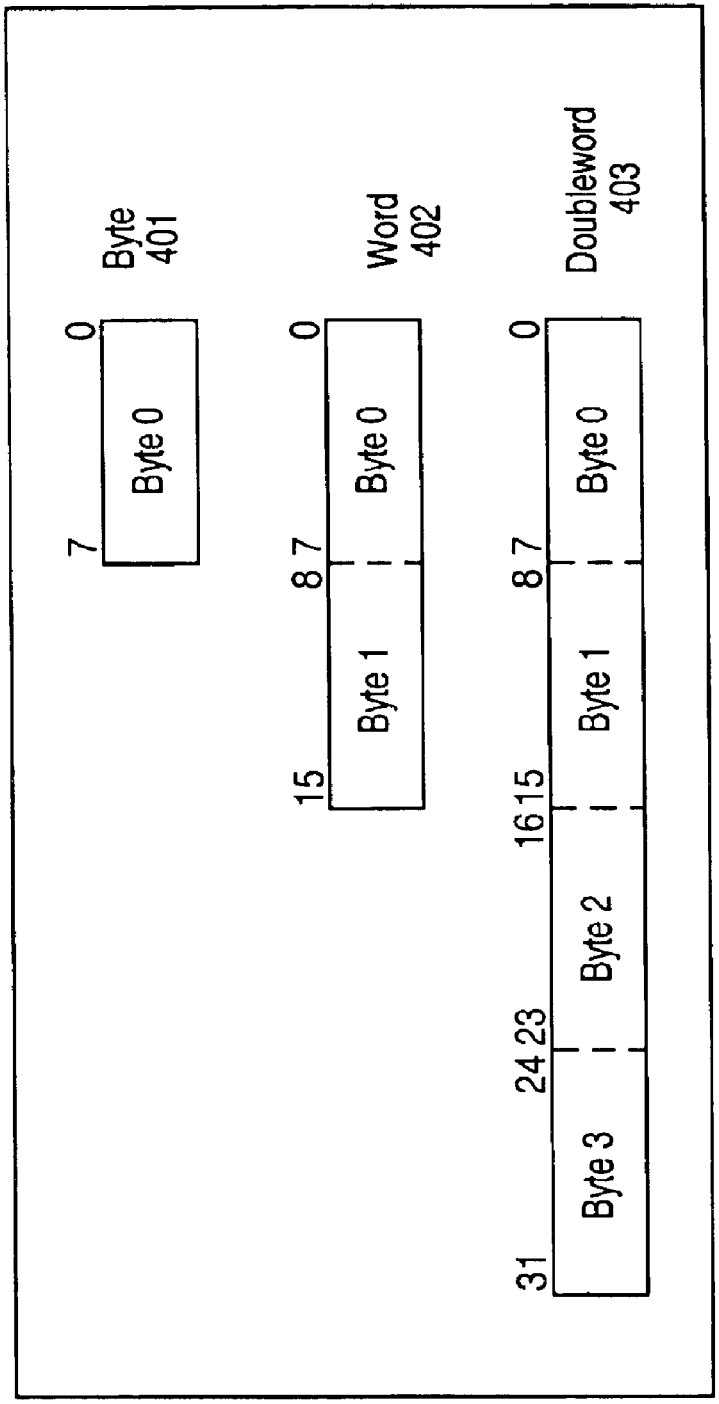
FIG. 4a illustrates memory data types.

FIG. 4a illustrates some of the data formats as may be used in the computer system of FIG. 1. These data formats are fixed point. Processor 109 can manipulate these data formats. Multimedia algorithms often use these data formats. A byte 401 contains eight bits of information. A word 402 contains sixteen bits of information, or two bytes. A doubleword 403 contains thirty-two bits of information, or four bytes. Thus, processor 109 executes control signals that may operate on any one of these memory data formats.

In the following description, references to bit, byte, word, and doubleword subfields are made. For example, bit six through bit zero of the byte $00111010_2$ (shown in base 2) represent the subfield $111010_2$.

Figure 4B:
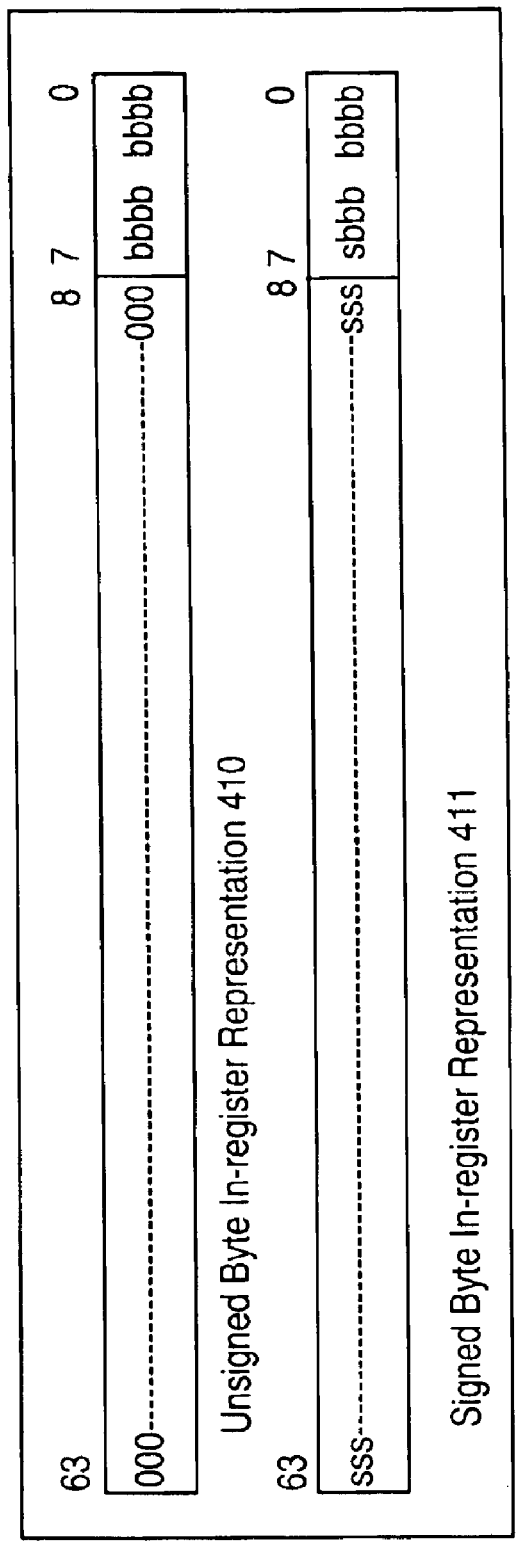
FIG. 4b, FIG. 4c and FIG. 4d illustrate in-register integer data representations.
Figure 4C:
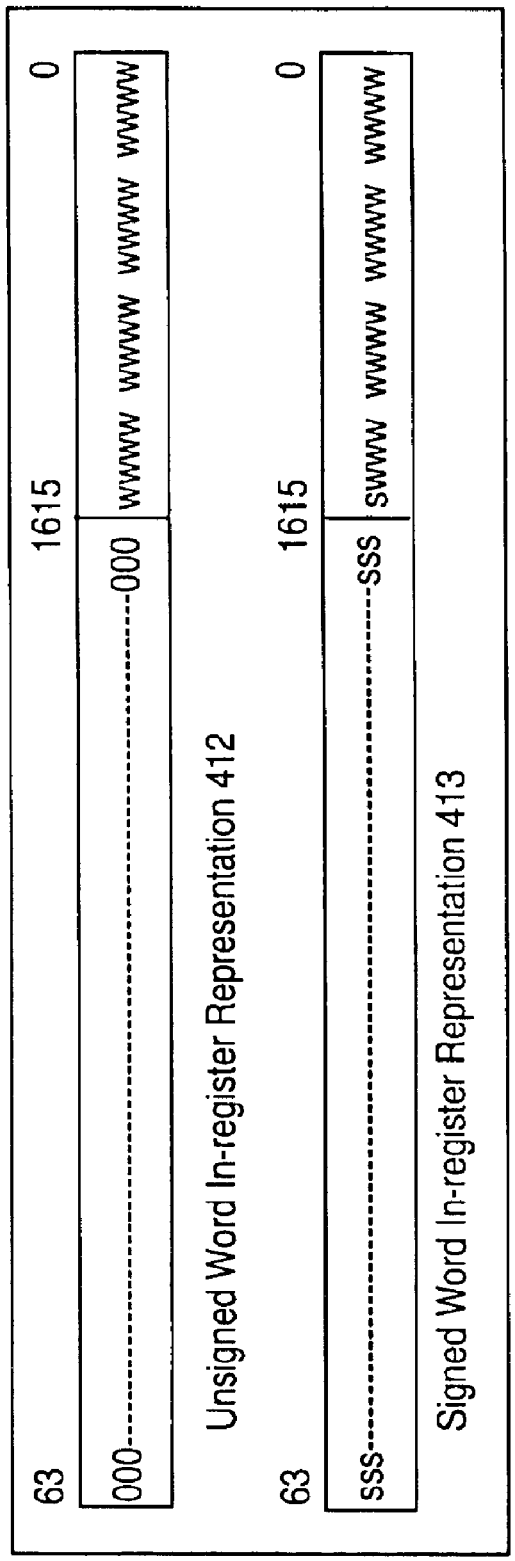
Figure 4D:
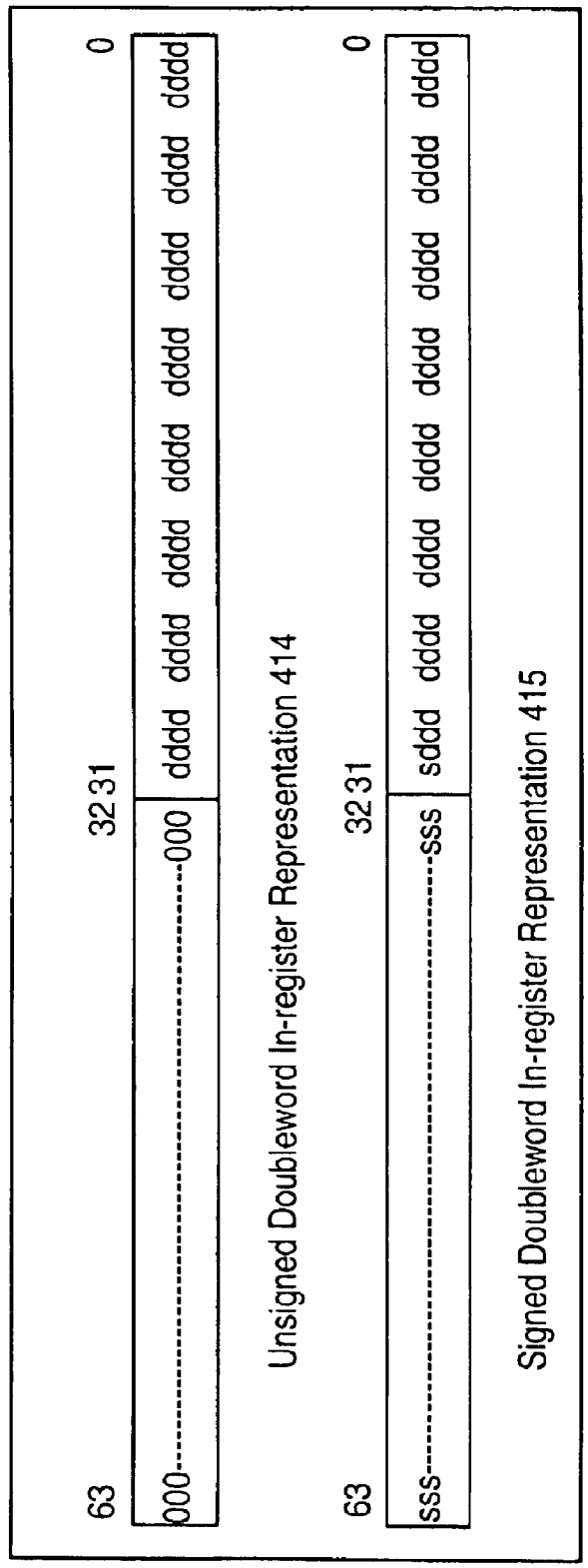

FIG. 4b through FIG. 4d illustrate in-register representations used in one embodiment of the present invention. For example, unsigned byte in-register representation 410 can represent data stored in a register in integer registers 201. In one embodiment, a register in integer registers 201 is sixty-four bits in length. In another embodiment, a register in integer registers 201 is thirty-two bits in length. For the simplicity of the description, the following describes sixty-four bit integer registers, however, thirty-two bit integer registers can be used. In other embodiments, other sizes of registers may be used.

Unsigned byte in-register representation 410 illustrates processor 109 storing an unsigned byte in integer registers 201. The first eight bits, bit seven through bit zero, in that register are dedicated to the data byte 401. These bits are shown as {b}. To properly represent this byte, the remaining 56 bits must be zero. For a signed byte in-register representation 411, integer registers 201 store the magnitude of a signed byte in the first seven bits, bit six through bit zero. The seventh bit represents the sign bit, shown as an {s}. Each of the remaining bits, bit sixty-three through bit eight, contain the sign bit.

Unsigned word in-register representation 412 is stored in one register of integer registers 201. Bit fifteen through bit zero contain an unsigned word. These bits are shown as {w}. To properly represent this word, the remaining bit sixty-three through bit sixteen must be zero. The magnitude of a signed word is stored in bit fourteen through bit zero as shown in the signed word in-register representation 413. Each of the remaining bits, bit sixty-three through bit eight, contain the sign bit.

A doubleword can be stored as an unsigned doubleword in-register representation 414 or a signed doubleword in-register representation 415. Bit thirty-one through bit zero of an unsigned doubleword in-register representation 414 contain an unsigned doubleword. These bits are shown as {d}. To properly represent this unsigned doubleword, the remaining bit sixty-three through bit thirty-two must be zero. Integer registers 201 stores the magnitude of a signed doubleword in bit thirty through bit zero as shown in signed doubleword in-register representation. Each of the remaining bits, bit sixty-three through bit eight, contain the sign bit.

As indicated by the above FIG. 4b through FIG. 4d, storage of some data types in a sixty-four bit wide register is an inefficient method of storage. For example, for storage of an unsigned byte in-register representation 410 bit sixty-three through bit eight must be zero, while only bit seven through bit zero may contain non-zero bits. Thus, a processor storing a byte in a sixty-four bit register uses only 12.5% of the register's capacity. Similarly, only the first few bits of operations performed by functional unit 203 will be important.

Figure 5A:
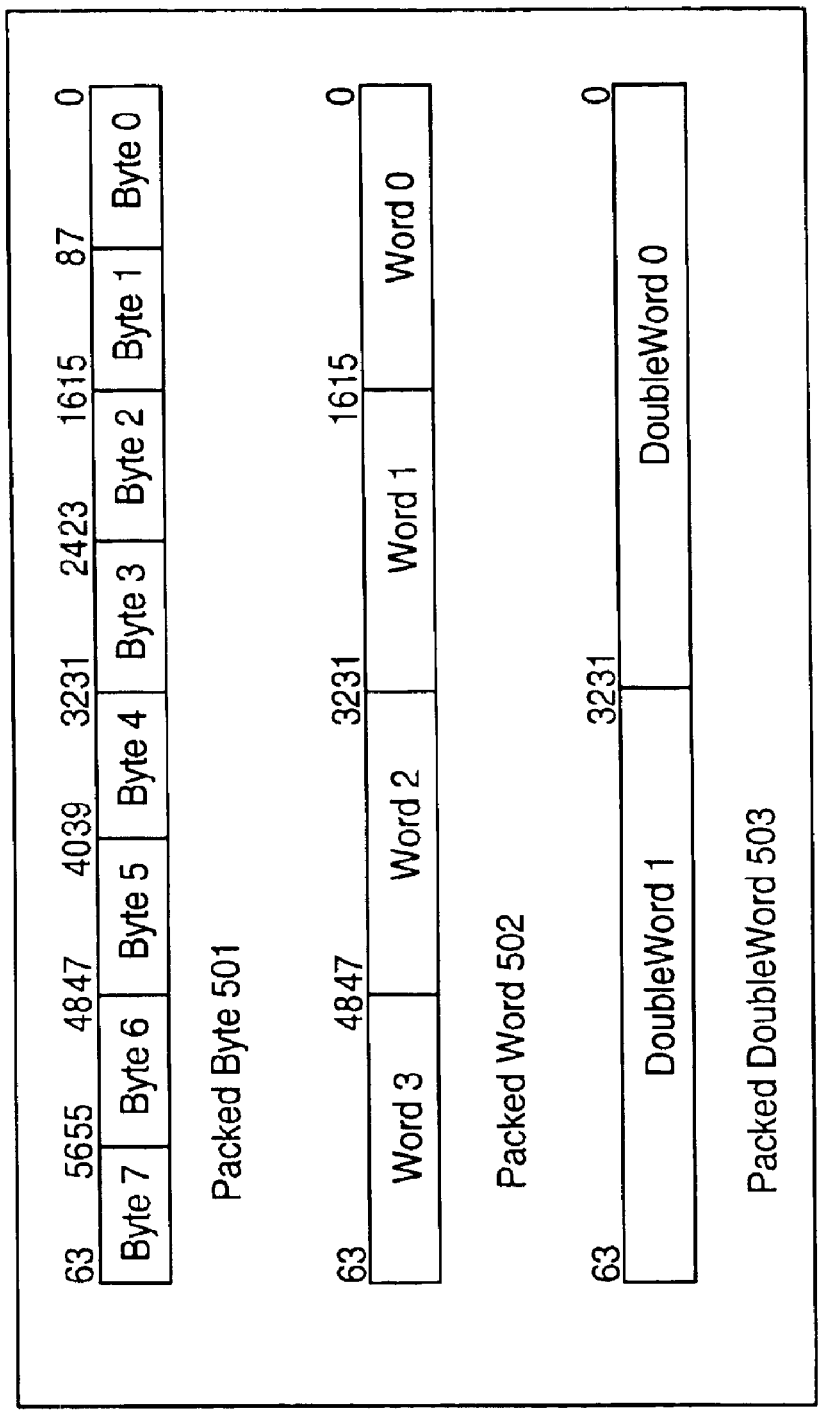
FIG. 5a illustrates packed data-types.

FIG. 5a illustrates the data formats for packed data. Three packed data formats are illustrated; packed byte 501, packed word 502, and packed doubleword 503. Packed byte, in one embodiment of the present invention, is sixty-four bits long containing eight data elements. Each data element is one byte long. Generally, a data element is an individual piece of data that is stored in a single register (or memory location) with other data elements of the same length. In one embodiment of the present invention, the number of data elements stored in a register is sixty-four bits divided by the length in bits of a data element.

Packed word 502 is sixty-four bits long and contains four word 402 data elements. Each word 402 data element contains sixteen bits of information.

Packed doubleword 503 is sixty-four bits long and contains two doubleword 403 data elements. Each doubleword 403 data element contains thirty-two bits of information.

Figure 5D:
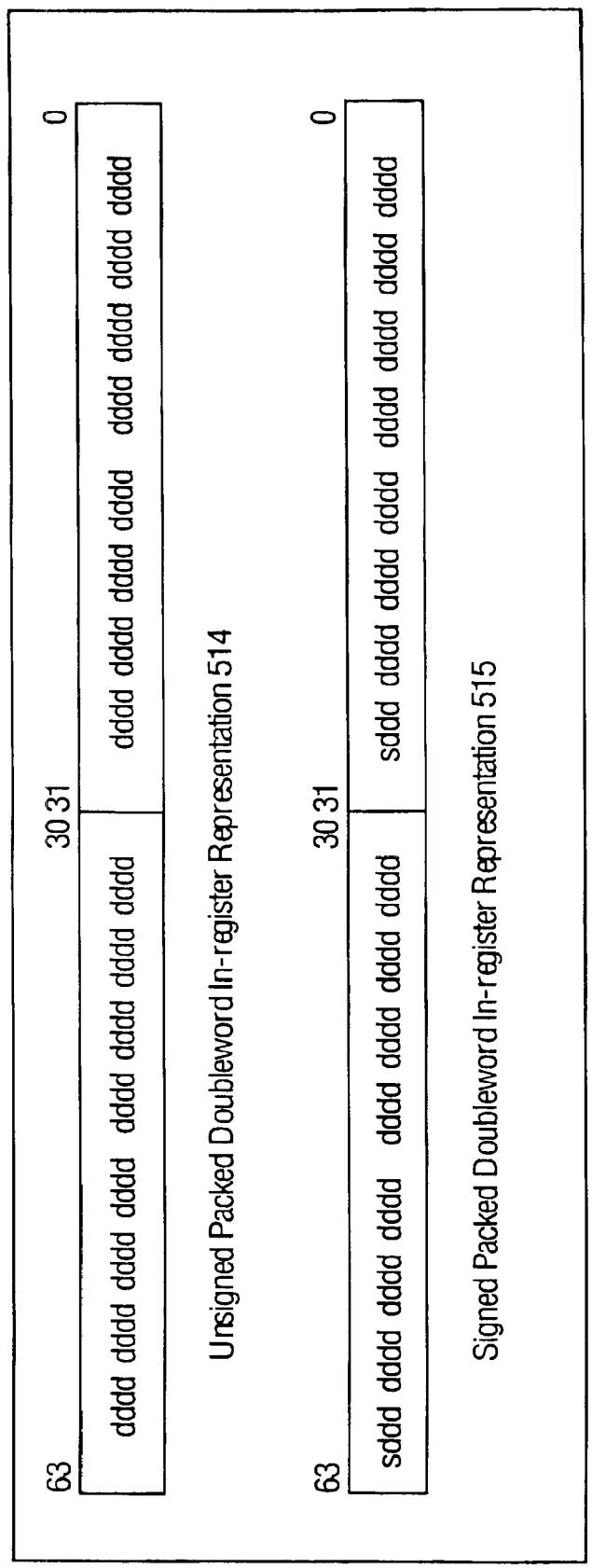

FIG. 5b through FIG. 5d illustrate the in-register packed data storage representation. Unsigned packed byte in-register representation 510 illustrates the storage of packed byte 501 in one of the registers $R_0$ 212a through $R_n$ 212af. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 is similarly stored in a register in registers 209. Note that only the eighth bit of every byte data element is the necessary sign bit; other bits may or may not be used to indicate sign.

Unsigned packed word in-register representation 512 illustrates how word three through word zero are stored in one register of registers 209. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that only the sixteenth bit of each word data element contains the necessary sign indicator.

Unsigned packed doubleword in-register representation 514 shows how registers 209 store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

As mentioned previously, registers 209 may be used for both packed data and integer data. In this embodiment of the present invention, the individual programming processor 109 may be required to track whether an addressed register, $R_0$ 212a for example, is storing packed data or simple integer/fixed point data. In an alternative embodiment, processor 109 could track the type of data stored in individual registers of registers 209. This alternative embodiment could then generate errors if, for example, a packed addition operation were attempted on simple/fixed point integer data.

Control Signal Formats

The following describes one embodiment of control signal formats used by processor 109 to manipulate packed data. In one embodiment of the present invention, control signals are represented as thirty-two bits. Decoder 202 may receive control signal 207 from bus 101. In another embodiment, decoder 202 can also receive such control signals from cache 206.

FIG. 6a illustrates a general format for a control signal operating on packed data. Operation field OP 601, bit thirty-one through bit twenty-six, provides information about the operation to be performed by processor 109; for example, packed addition, packed subtraction, etc. SRC1 602, bit twenty-five through twenty, provides the source register address of a register in registers 209. This source register contains the first packed data, Source1, to be used in the execution of the control signal. Similarly, SRC2 603, bit nineteen through bit fourteen, contains the address of a register in registers 209. This second source register contains the packed data, Source2, to be used during execution of the operation. DEST 605, bit five through bit zero, contains the address of a register in registers 209. This destination register will store the result packed data, Result, of the packed data operation.

Control bits SZ 610, bit twelve and bit thirteen, indicates the length of the data elements in the first and second packed data source registers. If SZ 610 equals $01_2$, then the packed data is formatted as packed byte 501. If SZ 610 equals $10_2$, then the packed data is formatted as packed word 502. SZ 610 equaling $00_2$ or $11_2$ is reserved, however, in another embodiment, one of these values could be used to indicate that the packed data is to be formatted as a packed doubleword 503.

Control bit T 611, bit eleven, indicates whether the operation is to be carried out with saturate mode. If T 611 equals one, then a saturating operation is performed. If T 611 equals zero, then a nonsaturating operation is performed. Saturating operations will be described later.

Control bit S 612, bit ten, indicates the use of a signed operation. If S 612 equals one, then a signed operation is performed. If S 612 equals zero, then an unsigned operation is performed.

FIG. 6b illustrates a second general format for a control signal operating on packed data. This format corresponds with the general integer opcode format described in the "Pentium™ Processor Family User's Manual," available from Intel Corporation, Literature Sales, P.O. Box 7641, Mt. prospect, Ill., 60056-7641. Note that OP 601, SZ 610, T 611, and S 612 are all combined into one large field. For some control signals, bits three through five are SRC1 602. In one embodiment, where there is a SRC1 602 address, then bits three through five also correspond to DEST 605. In an alternate embodiment, where there is a SRC2 603 address, then bits zero through two also correspond to DEST 605. For other control signals, like a packed shift immediate operation, bits three through five represent an extension to the opcode field. In one embodiment, this extension allows a programmer to include an immediate value with the control signal, such as a shift count value. In one embodiment, the immediate value follows the control signal. This is described in more detail in the "Pentium™ Processor Family User's Manual," in appendix F, pages F-1 through F-3. Bits zero through two represent SRC2 603. This general format allows register to register, memory to register, register by memory, register by register, register by immediate, register to memory addressing. Also, in one embodiment, this general format can support integer register to register, and register to integer register addressing.

Description of Saturate/Unsaturate

As mentioned previously, T 611 indicates whether operations optionally saturate. Where the result of an operation, with saturate enabled, overflows or underflows the range of the data, the result is clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 1.

TABLE 1

| Data Format | Minimum Value | Maximum Value |
| --- | --- | --- |
| Unsigned Byte | 0 | 255 |
| Signed Byte | −128 | 127 |
| Unsigned Word | 0 | 65535 |
| Signed Word | −32768 | 32767 |
| Unsigned Doubleword | 0 | $2^{32} - 1$ |
| Signed Doubleword | $-2^{31}$ | $2^{31} - 1$ |

As mentioned above, T 611 indicates whether saturating operations are being performed. Therefore, using the unsigned byte data format, if an operation's result is equal to 258 and saturation was enabled, then the result would be clamped to 255 before being stored into the operation's destination register. Similarly, if an operation's result is equal to −32999 and processor 109 used signed word data format with saturation enabled, then the result would be clamped to −32768 before being stored into the operation's destination register.

Shift Operation

In one embodiment of the present invention, the performance of CSC applications is improved by not only supporting a standard CISC instruction set (unpacked data operations), but by supporting a shift operation on packed data. The packed shift can be used to increase the speed of fixed-point implements of Fast Fourier Transforms, Cosine Transforms, and other digital image and audio signal processing algorithms.

In one embodiment of the present invention, the SRC1 register contains the data (Source1) to be shifted, the SRC2 register contains the data (Source2) representing the shift count, and DEST register will contain the result of the shift (Result). That is, Source1 will have each data element independently shifted by the shift count. In one embodiment, Source2 is interpreted as an unsigned 64 bit scalar. In another embodiment, Source2 is packed data and contains shift counts for each corresponding data element in Source1.

In one embodiment of the present invention, both arithmetic shifts and logical shifts are supported. An arithmetic shift, shifts the bits of each data element down by a specified number, and fills the high order bit of each data element with the initial value of the sign bit. A shift count greater than seven for packed byte data, greater than fifteen for packed word data, or greater than thirty-one for packed doubleword, causes the each Result data element to be filled with the initial value of the sign bit. A logical shift can operate by shifting bits up or down. In a shift right logical, the high order bits of each data element are filled with zeroes. A shift left logical causes the least significant bits of each data element to be filled with zeroes.

In one embodiment of the present invention, a shift right arithmetic, the shift right logical, and the shift left logical operations are supported for packed bytes and packed words. In another embodiment of the present invention, these operations are supported for packed doublewords also.

Figure 7:
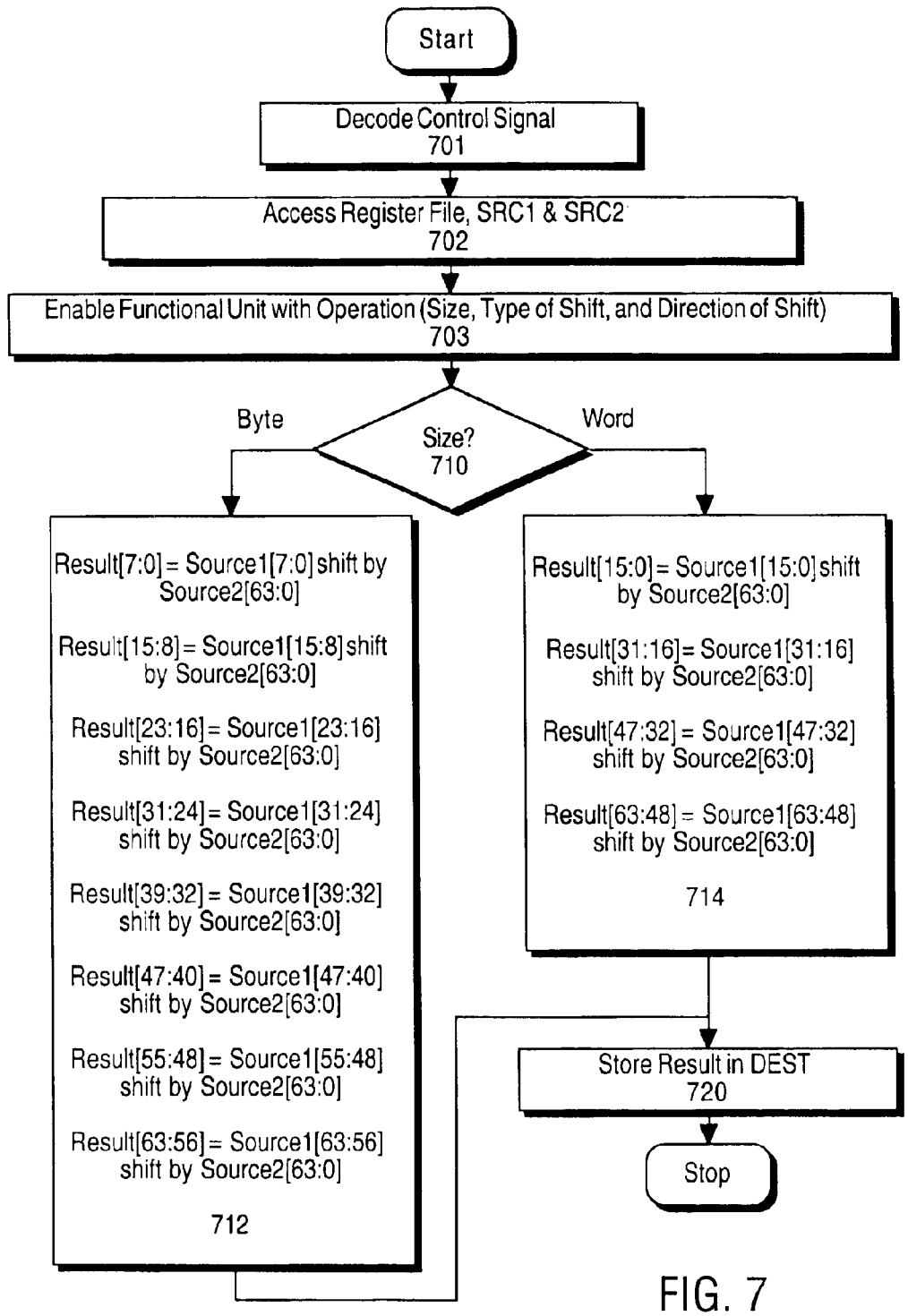
FIG. 7 illustrates one embodiment of a method followed by a processor when performing a shift operation on packed data.

FIG. 7 illustrates one embodiment of a method of performing a shift operation on packed data. This embodiment can be implemented in the processor 109 of FIG. 2.

At step 701, decoder 202 decodes control signal 207 received by processor 109. Thus, decoder 202 decodes: the operation code for the appropriate shift operation; SRC1 602, SRC2 603 and DEST 605 addresses in integer registers 209; saturate/unsaturate (not necessarily needed for shift operations), signed/unsigned (again not necessarily needed), and length of the data elements in the packed data.

At step 702, via internal bus 205, decoder 202 accesses integer registers 209 in register file 204 given the SRC1 602 and SRC2 603 addresses. Integer registers 209 provides functional unit 203 with the packed data stored in the SRC1 602 register (Source 1), and the scalar shift count stored in SRC2 603 register (Source2). That is, integer registers 209 communicate the packed data to functional unit 203 via internal bus 205.

At step 703, decoder 202 enables functional unit 203 to perform the appropriate packed shift operation. Decoder 202 further communicates, via internal bus 205, the size of data elements, the type of shift operation, and the direction of the shift (for logical shifts).

At step 710, the size of the data element determines which step is to be executed next. If the size of the data elements is eight bits (byte data), then functional unit 203 performs step 712. However, if the size of the data elements in the packed data is sixteen bits (word data), then functional unit 203 performs step 714. In one embodiment, only eight bit and sixteen bit data element size packed shifts are supported. However, in another embodiment, a thirty-two bit data element size packed shift is also supported. In other embodiments, other size data elements may be supported.

Assuming the size of the data elements is eight bits, then step 712 is executed. In step 712, the following is performed. Source1 bits seven through zero are shifted by the shift count (Source2 bits sixty-three through zero) generating Result bits seven through zero. Source1 bits fifteen through eight are shifted by the shift count generating Result bits fifteen through eight. Source1 bits twenty-three through sixteen are shifted by the shift count generating Result bits twenty-three through sixteen. Source 1 bits thirty-one through twenty-four are shifted by the shift count generating Result bits thirty-one through twenty-four. Source1 bits thirty-nine through thirty-two are shifted by the shift count generating Result bits thirty-nine through thirty-two. Source1 bits forty-seven through forty are shifted by the shift count generating Result forty-seven through forty. Source1 bits fifty-five through forty-eight are shifted by the shift count generating Result bits fifty-five through forty-eight. Source1 bits sixty-three through fifty-six are shifted by the shift count generating Result bits sixty-three through fifty-six.

Assuming the size of the data elements is sixteen bits, then step 714 is executed. In step 714, the following is performed. Source1 bits fifteen through zero are shifted by the shift count generating Result bits fifteen through zero. Source1 bits thirty-one through sixteen are shifted by the shift count generating Result bits thirty-one through sixteen. Source1 bits forty-seven through thirty-two are shifted by the shift count generating Result bits forty-seven through thirty-two. Source 1 bits sixty-three through forty-eight are shifted by the shift count generating Result bits sixty-three through forty-eight.

In one embodiment, the shifts of step 712 are performed simultaneously. However, in another embodiment, these shifts are performed serially. In another embodiment, some of these shifts are performed simultaneously and some are performed serially. This discussion applies to the shifts of step 714 as well.

At step 720, the Result is stored in the DEST register.

Table 2 illustrates the in-register representation of packed shift right arithmetic operation. The first row of bits is the packed data representation of Source1. The second row of bits is the data representation of Source2. The third row of bits is the presentation of the Result. The number below each data element bit is the umber. For example, Source1 data element three is 10000000$_2$.

TABLE 2

| 00101010 | 01010101 | 01010101 | 11111111 | 10000000 | 01110000 | 10001111 | 10001000 |
|---|---|---|---|---|---|---|---|
| 7 | 6 | 5 | 4 | 3 | 2 | 1 | 0 |
| Shift | Shift | Shift | Shift | Shift | Shift | Shift | Shift |
| 00000000 | 00000000 | 00000000 | 00000000 | 00000000 | 00000000 | 00000000 | 00000100 |
| = | = | = | = | = | = | = | = |
| 00000010 | 00000101 | 00000101 | 11111111 | 11110000 | 00000111 | 11111000 | 11111000 |
| 7 | 6 | 5 | 4 | 3 | 2 | 1 | 0 |

Table 3 illustrates the in-register representation of packed shift right logical operation on packed byte data.

TABLE 3

| 00101010 | 01010101 | 01010101 | 11111111 | 10000000 | 01110000 | 10001111 | 10001000 |
|---|---|---|---|---|---|---|---|
| 7 | 6 | 5 | 4 | 3 | 2 | 1 | 0 |
| Shift | Shift | Shift | Shift | Shift | Shift | Shift | Shift |
| 00000000 | 00000000 | 00000000 | 00000000 | 00000000 | 00000000 | 00000000 | 00000011 |
| = | = | = | = | = | = | = | = |
| 00000101 | 00001010 | 00001010 | 00011111 | 00010000 | 00001110 | 00010001 | 00010001 |
| 7 | 6 | 5 | 4 | 3 | 2 | 1 | 0 |

Table 4 illustrates the in-register representation of packed shift left logical operation on packed byte data.

TABLE 4

| 00101010 | 01010101 | 01010101 | 11111111 | 10000000 | 01110000 | 10001111 | 10001000 |
|---|---|---|---|---|---|---|---|
| 7 | 6 | 5 | 4 | 3 | 2 | 1 | 0 |
| Shift | Shift | Shift | Shift | Shift | Shift | Shift | Shift |
| 00000000 | 00000000 | 00000000 | 00000000 | 00000000 | 00000000 | 00000000 | 00000011 |
| = | = | = | = | = | = | = | = |
| 01010000 | 10101000 | 10101000 | 11111000 | 00000000 | 10000000 | 01111000 | 01000000 |
| 7 | 6 | 5 | 4 | 3 | 2 | 1 | 0 |

Circuit Descriptions

The convention followed in the subsequent descriptions of circuits is that the bus names correspond to the signal names on that bus. For example, a Source1 signal is on a Source1 bus. Busses with multiple bits may be designated with particular bit ranges. For example, Source1[31:16] indicates that the bus corresponds to bits 31 through 16 of the Source1 bus. The whole bus may be referred to as the Source1 bus or Source1[63:0] (for a 64 bit bus). The complement of a signal may be referred to by Appending an "#" after the signal name. For example, the complement of the Source1 signal on the Source1 bus is the Source1# signal on the Source1# bus.

Packed Shift Circuit

Figure 8:
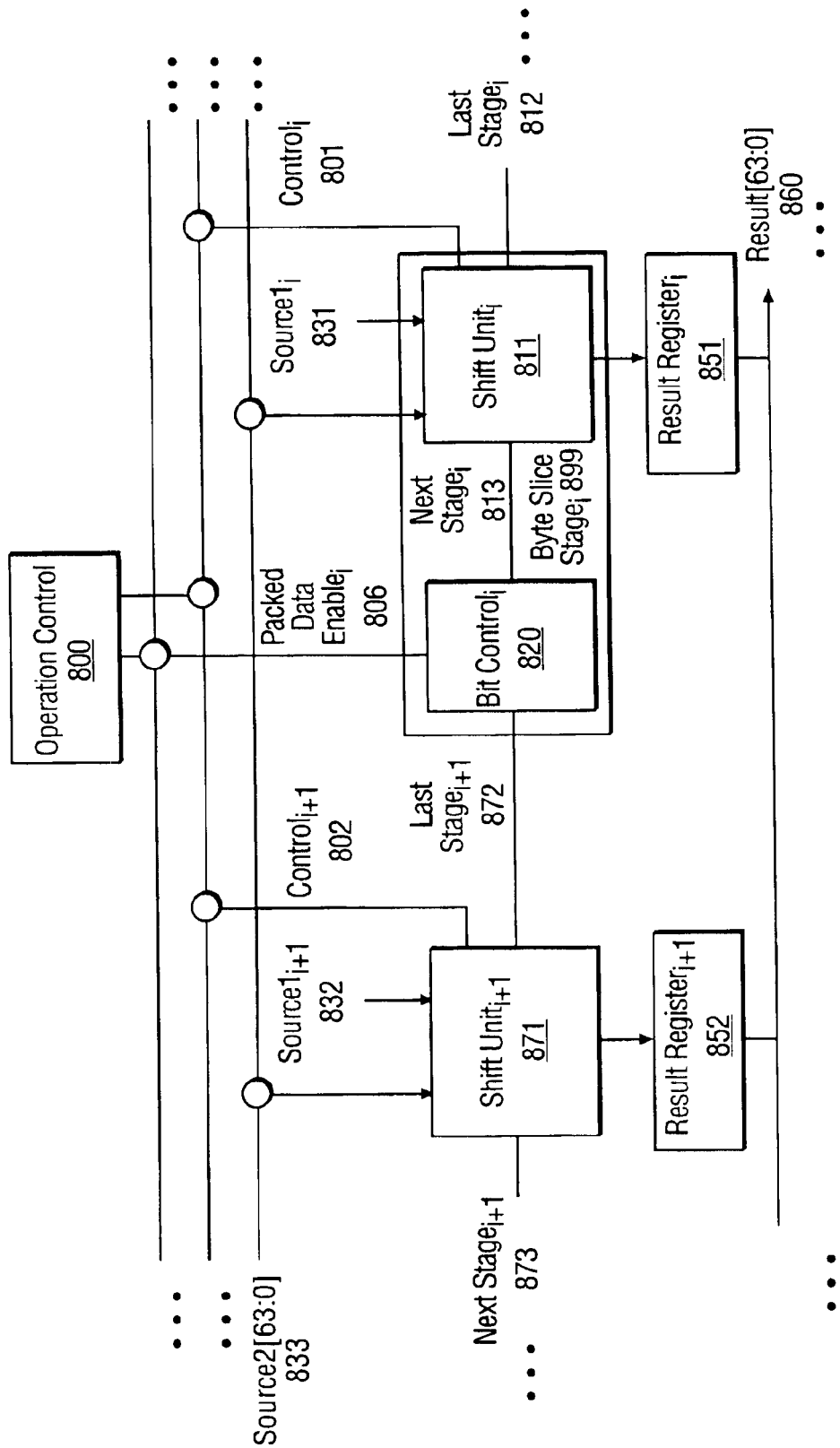
FIG. 8 illustrates one embodiment of a Packed Shift circuit.

In one embodiment, the shift operation can occur on multiple data elements in the same number of clock cycles as a single shift operation on unpacked data. To achieve execution in the same number of clock cycles, parallelism is used. That is, registers are simultaneously instructed to perform the shift operation on the data elements. This is discussed in more detail below. FIG. 8 illustrates one embodiment of a portion of a circuit that can perform a shift operation on packed data in the same number of clock cycles as a shift operation on unpacked data.

FIG. 8 illustrates the use of a modified byte slice shift circuit, byte slice stage$_i$ 899. Each byte slice, except for the most significant data element byte slice, includes a shift unit and bit control. The most significant data element byte slice need only have a shift unit.

Shift unit$_i$ 811 and shift unit$_{i+1}$ 871 each allow eight bits from Source1 to be shifted by the shift count. In one embodiment, each shift unit operates like a known eight bit shift circuit. Each shift unit has a Source1 input, a Source2 input, a control input, a next stage signal, a last stage signal, and a result output. Therefore, shift unit$_i$ 811 has Source1$_i$ 831 input, Source2[63:0] 833 input, control$_i$ 801 input, next stage$_i$ 813 signal, last stage$_i$ 812 input, and a result stored in result register$_i$ 851. Therefore, shift unit$_{i+1}$ 871 has Source1$_{i+1}$ 832 input, Source2[63:0] 833 input, control$_{i+1}$ 802 input, next stage$_{i+1}$ 873 signal, last stage$_{i+1}$ 872 input, and a result stored in result register$_{i+1}$ 852.

The Source1 input is typically an eight bit portion of Source1. The eight bits represents the smallest type of data element, one packed byte data element. Source2 input represents the shift count. In one embodiment, each shift unit receives the same shift count from Source2[63:0] 833. Operation control 800 transmits control signals to enable each shift unit to perform the required shift. The control signals are determined from the type of shift (arithmetic/logical) and the direction of the shift. The next stage signal is received from the bit control for that shift unit. The shift unit will shift the most significant bit out/in on the next stage signal, depending on the direction of the shift (left/right). Similarly, each shift unit will shift the least significant bit out/in on the last stage signal, depending on the direction of the shift (right/left). The last stage signal being received from the bit control unit of the previous stage. The result output represents the result of the shift operation on the portion of Source1 the shift unit is operating upon.

Bit control$_i$ 820 is enabled from operation control 800 via packed data enable$_i$ 806. Bit control$_i$ 820 controls next stage$_i$ 813 and last stage$_{i+1}$ 872. Assume, for example, shift unit$_i$ 811 is responsible for the eight least significant bits of Source1, and shift unit$_{i+1}$ 871 is responsible for the next eight bits of Source1. If a shift on packed bytes is performed, bit control$_i$ 820 will not allow the least significant bit from shift unit$_{i+1}$ 871 to be communicated with the most significant bit of shift unit$_i$ 811. However, a shift on packed words is performed, then bit control$_i$ 820 will allow the least significant bit from shift unit$_{i+1}$ 871 to be communicated with the most significant bit of shift unit$_i$ 811.

For example, in Table 5, a packed byte arithmetic shift right is performed. Assume that shift unit$_{i+1}$ 871 operates on data element one, and shift unit$_i$ 811 operates on data element zero. Shift unit$_{i+1}$ 871 shifts its least significant bit out. However operation control 800 will cause bit control$_i$ 820 to stop the propagation of that bit, received from last stage$_{i+1}$ 821, to next stage$_i$ 813. Instead, shift unit$_i$ 811 will fill the high order bits with the sign bit, Source1[7].

TABLE 5

| ... | ... | ... | ... | ... | ... | 00001110 | 10001000 |
|---|---|---|---|---|---|---|---|
| 7 Shift | 6 Shift | 5 Shift | 4 Shift | 3 Shift | 2 Shift | 1 Shift | 0 Shift |
| ... | ... | ... | ... | ... | ... | ... | 00000001 |
| = | = | = | = | = | = | = | = |
| ... | ... | ... | ... | ... | ... | 00000111 | 11000100 |
| 7 | 6 | 5 | 4 | 3 | 2 | 1 | 0 |

However, if a packed word arithmetic shift is performed, then the least significant bit of shift unit$_{i+1}$ 871 will be communicated to the most significant bit of shift unit$_i$ 811. Table 6 illustrates this result. This communication would be allowed for packed doubleword shifts as well.

TABLE 6

| ... | ... | ... | 00001110 10001000 |
|---|---|---|---|
| 3 Shift | 2 Shift | 1 Shift | 0 Shift |
| ... | ... | ... | 00000001 |
| = | = | = | = |
| ... | ... | ... | 00000111 01000100 |
| 3 | 2 | 1 | 0 |

Each shift unit is optionally connected to a result register. The result register temporarily stores the result of the shift operation until the complete result, Result[63:0] 860 can be transmitted to the DEST register.

For a complete sixty-four bit packed shift circuit, eight shift units and seven bit control units are used. Such a circuit can also be used to perform a shift on a sixty-four bit unpacked data, thereby using the same circuit to perform the unpacked shift operation and the packed shift operation.

Another Packed Shift Circuit

Figure 9:
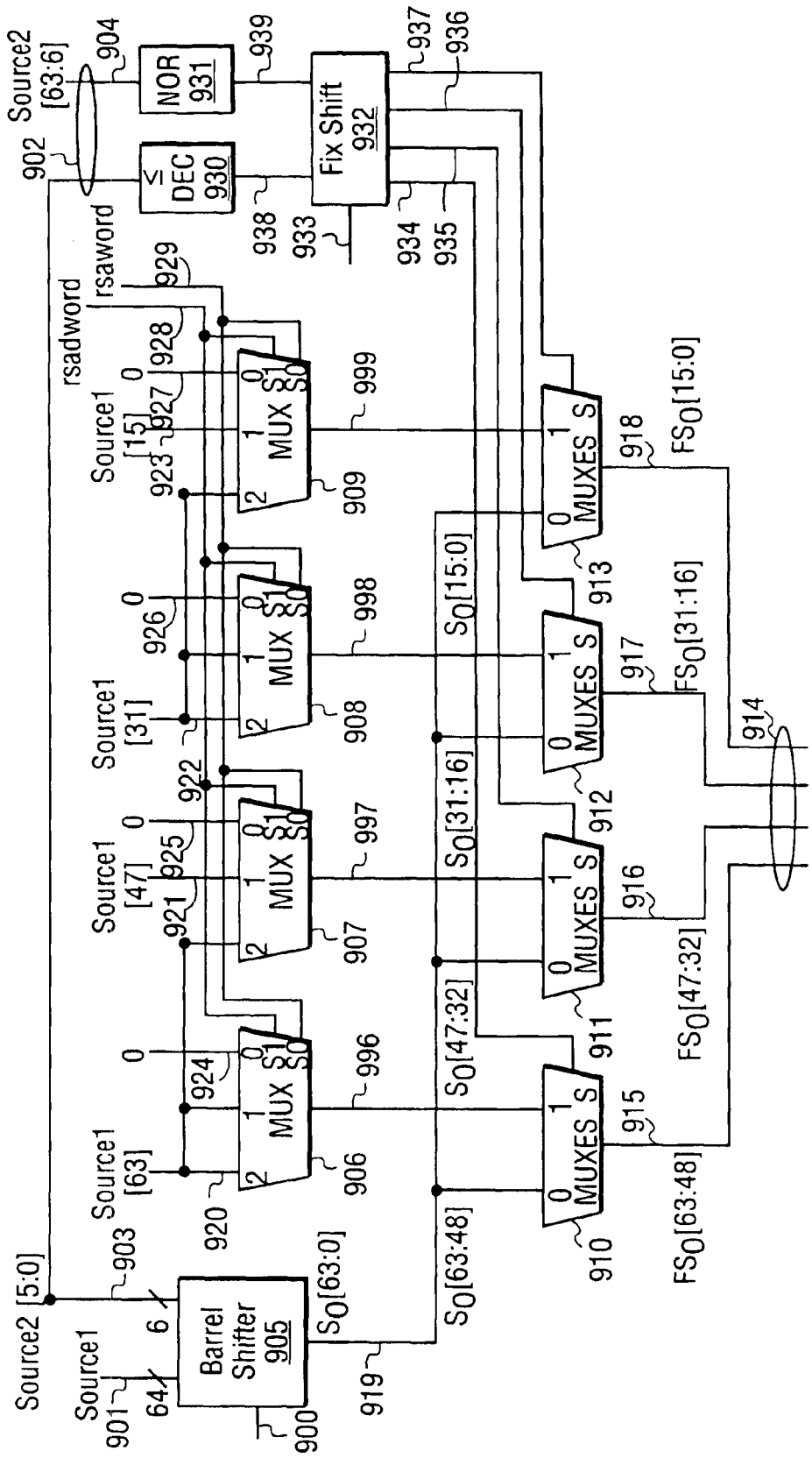
FIG. 9 illustrates another embodiment of a Packed Shift circuit.

FIG. 9 illustrates another embodiment of a packed shift circuit. In one embodiment, the packed shift circuit is capable of performing arithmetic shift operations on multiple data types. For example, the packed shift circuit may be capable of performing a packed shift on data elements which each contain one 64-bit value, two 32-bit data values, or four 16-bit values. This embodiment may also be implemented to be capable of alternatively or additionally performing logical shift operations, right shifts, and/or left shifts.

A barrel shifter 905 is used to shift Source1 by the count specified in the low order bits of Source2. However, if Source1 is a packed data type, the barrel shifter shifts the low order bits of each of the values in the packed data type into the high order bits of the next lowest order value to produce a shifted packed intermediate result. A correction circuit is used to replace each of these bits with the most significant bit of the corresponding value if it is a signed shift operation, and a zero if it is a logical shift operation. In one embodiment, if at least one of the high order bits that are not required to specify the shift count is one, all the bits of the shifted packed intermediate result are replaced with the sign bit (for right arithmetic shifts) or zero (for logical shifts). One embodiment of the barrel shifter 905 is described with reference to FIG. 10.

The shift data is driven on a Source1 bus 901. The shift count is driven on a Source2 bus 902 in two portions, Source2[5:0], an actual shift count bus 903, Source2[63:6], and an overflow shift count bus 904. The six bits required to specify a shift count ranging from 0 to 63 are specified on the actual shift count bus 903. The rest of the 64-bit data field is specified on the overflow shift count bus 904. The Source1 bus 901, the actual shift count bus 903, and a left shift bus 900 are coupled to the inputs of the barrel shifter 905. In one embodiment, the barrel shifter 905 contains a set of muxes that use complex gates (described below) to drive a set of 16-1 muxes which form one stage of the barrel shifter 905. The barrel shifter 905 drives a shift output bus 919.

Muxes 906–909 drive the replacements bits that are used to correct the appropriate bits of a shift output bus 914. Each of the muxes 906–909 corresponding to the most-significant to the least significant word of the shift output bus 914, respectively. A right-shift arithmetic doubleword (rsadword) bus 928 is coupled to the most-significant select bit of each of the muxes 906–909 to indicate whether the shift operation is an arithmetic right shift that operated on packed doubleword data. A right-shift arithmetic word (rsaword) bus 929 is coupled to the least-significant select bit of each of the muxes 906–909 to indicate whether the shift operation is an arithmetic right shift that operated on packed word data. The rsadword signal and the rsaword signal may be generated based on the decoding of the control signal 207, for example. A zero is driven through a set of zero busses 924–927 which are coupled to the zero input of each of the muxes 906–909, respectively. A zero is used to correct the selected bits on the shift output bus 919 when the operation is neither a right shift arithmetic word or fight shift arithmetic doubleword operation. The operation may be a left shift or a logical shift, for example. When the operation is a rsaword operation, the most significant bit of each word (the sign bit) is used to correct the selected bit of each corresponding word of the shifted packed intermediate result on the shift output bus 919. A Source1[63] bus 920, a Source1[47] bus 921, a Source1[31] bus 922, and a Source1[15] bus 923 are coupled to the corresponding 1 inputs of each of the muxes 906–909, respectively. The sign bit of each of the words of the packed word data are driven onto the corresponding bus. When the operation is a rsadword operation, the most significant bit of each doubleword (the sign bit) is used to correct the selected bits of each corresponding doubleword of the shifted packed intermediate result on the shift output bus 919. The Source1 [63] bus 920 and the Source1[31] bus 922 are coupled to the corresponding two inputs of muxes 906–907 and muxes 908–909, respectively. The sign bit of each of the corresponding doublewords is driven onto the corresponding bus. Each of the muxes 906–909 drives a corresponding replacement bit bus 996–999.

The actual shift count bus 903 is also coupled to the input of a less-than-or-equal-to (<=) decoder logic 930 which drives a 64-bit decoded signal on the decoded bus 938. The decoded signal is a field of zeroes with ones in the bit positions corresponding to numbers less than or equal to the value on the actual shift count bus 903. The bits that are one correspond to the bit positions of the shift output bus that should be corrected if the operation were a left shift of a 64-bit scalar data. The value on the decoded bus 938 is received and manipulated by a fixshift circuit 932 to produce the values on the fixdata busses 934–937 according to the operation and data type specified on the control bus 933 such that the appropriate bits of each value of the shifted packed intermediate result are corrected. For example, if a right shift of packed word data were indicated on the control bus 933 and a shift count of 6 was indicated on the actual shift count bus 903, the fixshift circuit 932 would replicate the least-significant 6 ones produced on the 64-bit decoded bus 938 on the most-significant 6 bits of each of the 16-bit fixdata busses 934–937. Alternatively, if a left shift of packed word data were indicated on the control bus 933 and a shift count of 6 was indicated on the actual shift count bus 903, the fixshift circuit 932 would replicate the least-significant 6 ones produced on the 64-bit decoded bus 938 on the least-significant 6 bits of each of the 16-bit fixdata busses 934–937. The the overflow shift count bus 904 is input to NOR logic 931 which produces an output on the NOR bus 939 that is one only if all the bits of the Source2[63:6] bus 904 are zero. When the NOR bus 939 is low, the Fixshift circuit 932 indicates that all bits should be replaced. More details of the Fixshift circuit 932 is provided below.

Each of the bits of the most significant word of the shift output bus 919 ($S_O$[63:48]) are coupled to the zero input of a corresponding one of the set of muxes 910. The replacement bit bus 996 which corresponds to the replacement bit for the most significant word is coupled to the one input of each of the set of muxes 910. Each bit of the fixdata bus 934 is coupled to the corresponding one of the set of muxes 910 to indicate whether the corresponding bit of the $S_O$[63:48] data or the corresponding bit on the replacement bit bus 996 is driven onto a corresponding bit of the fixed shift output ($FS_O$[63:48]) bus. The inputs and outputs of muxes 911–913 are similarly coupled, as illustrated in FIG. 9.

While FIG. 9 illustrates one circuit for implementation of a shifter circuit, any number of well-known shifter circuits providing the equivalent function may be used.

Fixshift Circuit

Figure 10:
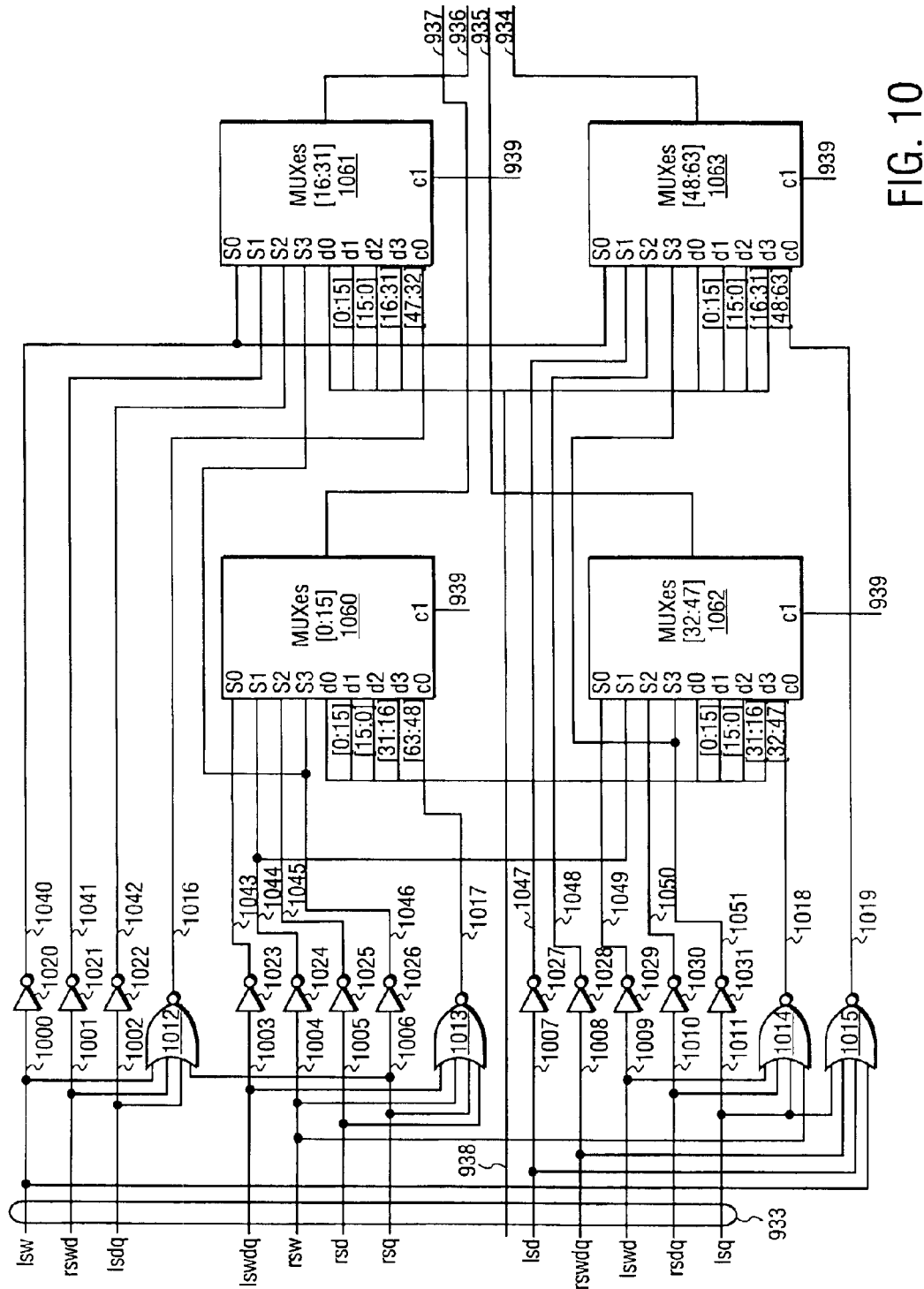
FIG. 10 illustrates an embodiment of a portion of the logic to identify which bits of barrel shifted result should be corrected (Fixshift).

FIG. 10 illustrates one embodiment of the fixshift circuit 932. The control bus 933 comprises a left-shift word (lsw) bus 1000, a right-shift word doubleword (rswd) bus 1001, a left-shift doubleword quadword (lsdq) bus 1002, a left-shift word doubleword quadword (lswdq) bus 1003, a right-shift word (rsw) bus 1004, a right-shift doubleword (rsd) bus 1005, a right-shift quadword (rsq) bus 1006, a left-shift doubleword (lsd) bus 1007, a right-shift word doubleword quadword (rswdq) bus 1008, a left-shift word doubleword (lswd) bus 1009, a right-shift doubleword quadword (rsdq) bus 1010, and a left-shift quadword (lsq) bus 1011. These signals may be generated based on the decoding of the control signal 207, for example. The names of the individual control signals indicate when they are asserted (active). These signals are a one when they are active (active high). For example, the lsw bus 1000 is only active when the operation is a left-shift of a packed word data. The rswd bus 1001 is only active when the operation is a right-shift operation of a packed word data or a packed doubleword data. Each of the busses of the control bus 933 are coupled to a corresponding one of inverters 1020–1031 which drive one of the corresponding busses comprising an lsw# bus 1040, an rswd# bus 1041, an lsdq# bus 1042, an lswdq# bus 1043, an rsw# bus 1044, an rsd# bus 1045, an rsq# bus 1046, an lsd# bus 1047, an rswdq# bus 1048, an lswd# bus 1049, an rsdq# bus 1050, and an lsq# bus 1051, respectively. These signals are zero when they are active (active low).

Each of a set of muxes 1060 drives a bit of the fixdata bus 937 to indicate which bits of the least significant word of the shift output bus 919 (referring to FIG. 9) should be replaced. The lswdq# bus 1043 is coupled to the select 0 input of each of the set of muxes 1060 to select each data 0 input whenever the operation is a left-shift of either a word, doubleword, or quadword. Each bit of the least significant word of the decoded bus 938 is coupled to a corresponding data input 0 of each of the set of muxes 1060. For example, the three least significant bits of the fixdata bus 937 would indicate that the three least significant bits of the least significant word of the shift output bus 919 (referring to FIG. 9) should be replaced for a lswdq with a shift count of 3. The rsw# bus 1044 is coupled to the select 1 input of each of the set of muxes 1060 to select each data 1 input whenever the operation is a right-shift of a word. Each bit of the least significant word of the decoded bus 938 is coupled to a corresponding data input 1 of each of the set of muxes 1060 in reverse order (The most significant bit of the decoded bus 938 drives the one of the set of muxes 1060 that drives the least significant bit of the fixdata bus 937, the second most significant bit of the decoded bus 938 drives the one of the set of muxes 1060 that drives the second least significant bit of the fixdata bus 937, etc.). For example, the three most significant bits of the fixdata bus 937 would indicate that the three least significant bits of the least significant word of the shift output bus 919 (referring to FIG. 9) should be replaced for a rsw with a shift count of 3. The rsd# bus 1045 is coupled to the select 2 input of each of the set of muxes 1060 to select each data 2 input whenever the operation is a right-shift of a doubleword. Each bit of the second least significant word of the decoded bus 938 is coupled to a corresponding data input 2 of each of the set of muxes 1060 in reverse order. For example, the three most significant bits of the fixdata bus 937 would indicate that the three least significant bits of the least significant word of the shift output bus 919 (referring to FIG. 9) should be replaced for a rsd with a shift count of 19. The right shift shifts through the most significant word of the least significant doubleword before it begins to effect the least significant word. The rsq# bus 1046 is coupled to the select 3 input of each of the set of muxes 1060 to select each data 3 input whenever the operation is a right-shift of a quadword. Each bit of the most significant word of the decoded bus 938 is coupled to a corresponding data input 3 of each of the set of muxes 1060 in reverse order. For example, the three most significant bits of the fixdata bus 937 would indicate that the three least significant bits of the least significant word of the shift output bus 919 (referring to FIG. 9) should be replaced for a rsq with a shift count of 51. The right shift shifts through the most significant 48 bits of the quadword before it begins to effect the least significant word.

The lswdq bus 1003, the rsw bus 1004, the rsd bus 1005, and the rsq bus 1006 are coupled to a NOR gate 1013 which drives a zero bus 1017. The zero bus 1017 is coupled to the control 0 (c0) input of each of the set of muxes 1060 to force a zero on all the bits of the fixdata bus 937 when none of the select inputs are active. In addition the NOR bus 939 is coupled to the control 1 (c1) input of each of the muxes to force a one on all the bits of the fixdata bus 937 when at least one of the most-significant bits on the overflow shift count bus 904 is non-zero. This forces all the bits of the shifted packed intermediate result on the shift output bus 719 to be replaced. This produces a result that is consistent with a Source1 value that is extended beyond the most significant and least significant bits of the register. If such a value is shifted by greater than the register size, the sign bit (for right arithmetic shifts) or the zero bits (for logical shifts) should replace the whole field.

Each of a set of muxes 1061 drives a bit of the fixdata bus 936 to indicate which bits of the second least significant word of the shift output bus 919 (referring to FIG. 9) should be replaced. The lsw# bus 1040 is coupled to the select 0 input of each of the set of muxes 1061 to select each data 0 input whenever the operation is a left-shift of a word. Each bit of the least significant word of the decoded bus 938 is coupled to a corresponding data input 0 of each of the set of muxes 1061. For example, the three least significant bits of the fixdata bus 936 would indicate that the three least significant bits of the second least significant word of the shift output bus 919 (referring to FIG. 9) should be replaced for a lsw with a shift count of 3. The rswd# bus 1041 is coupled to the select 1 input of each of the set of muxes 1061 to select each data 1 input whenever the operation is a right-shift of a word or a doubleword. Each bit of the least significant word of the decoded bus 938 is coupled to a corresponding data input 1 of each of the set of muxes 1061 in reverse order. For example, the three most significant bits of the fixdata bus 936 would indicate that the three least significant bits of the second least significant word of the shift output bus 919 (referring to FIG. 9) should be replaced for a rswd with a shift count of 3. The lsdq# bus 1042 is coupled to the select 2 input of each of the set of muxes 1061 to select each data 2 input whenever the operation is a left-shift of a doubleword or a quadword. Each bit of the second least significant word of the decoded bus 938 is coupled to a corresponding data input 2 of each of the set of muxes 1061. For example, the three least significant bits of the fixdata bus 936 would indicate that the three least significant bits of the second least significant word of the shift output bus 919 (referring to FIG. 9) should be replaced for a lsdq with a shift count of 19. The left shift shifts through the least significant word before it begins to effect the second least significant word. The rsq# bus 1046 is coupled to the select 3 input of each of the set of muxes 1061 to select each data 3 input whenever the operation is a right-shift of a quadword. Each bit of the second most significant word of the decoded bus 938 is coupled to a corresponding data input 3 of each of the set of muxes 1061 in reverse order. For example, the three most significant bits of the fixdata bus 936 would indicate that the three least significant bits of the second least significant word of the shift output bus 919 (referring to FIG. 9) should be replaced for a rsq with a shift count of 35. The right shift shifts through the most significant doubleword of the quadword before it begins to effect the second least significant word.

The lsw bus 1000, the rswd bus 1001, the lsdq bus 1002, and the rsq bus 1006 are coupled to a NOR gate 1012 which drives a zero bus 1016. The zero bus 1016 is coupled to the control 0 (c0) input of each of the set of muxes 1061 to force a zero on all the bits of the fixdata bus 936 when none of the select inputs are active. In addition the NOR bus 939 is coupled to the control 1 (c1) input of each of the muxes to force a one on all the bits of the fixdata bus 936 when at least one of the most-significant bits on the overflow shift count bus 904 is non-zero. This forces all the bits of the shifted packed intermediate result on the shift output bus 719 to be replaced.

Each of a set of muxes 1062 drives a bit of the fixdata bus 935 to indicate which bits of the second most significant word of the shift output bus 919 (referring to FIG. 9) should be replaced. The lswd# bus 1049 is coupled to the select 0 input of each of the set of muxes 1062 to select each data 0 input whenever the operation is a left-shift of either a word or doubleword. Each bit of the least significant word of the decoded bus 938 is coupled to a corresponding data input 0 of each of the set of muxes 1062. For example, the three least significant bits of the fixdata bus 935 would indicate that the three least significant bits of the second most significant word of the shift output bus 919 (referring to FIG. 9) should be replaced for a lswd with a shift count of 3. The rsw# bus 1044 is coupled to the select 1 input of each of the set of muxes 1062 to select each data 1 input whenever the operation is a right-shift of a word. Each bit of the least significant word of the decoded bus 938 is coupled to a corresponding data input 1 of each of the set of muxes 1060 in reverse order. For example, the three most significant bits of the fixdata bus 935 would indicate that the three least significant bits of the second most significant word of the shift output bus 919 (referring to FIG. 9) should be replaced for a rswd with a shift count of 3. The rsdq# bus 1050 is coupled to the select 2 input of each of the set of muxes 1062 to select each data 2 input whenever the operation is a right-shift of a doubleword or quadword. Each bit of the second least significant word of the decoded bus 938 is coupled to a corresponding data input 2 of each of the set of muxes 1062 in reverse order. For example, the three most significant bits of the fixdata bus 935 would indicate that the three least significant bits of the second most significant word of the shift output bus 919 (referring to FIG. 9) should be replaced for a rsdq with a shift count of 19. The right shift shifts through the most significant word before it begins to effect the second least significant word. The lsq# bus 1051 is coupled to the select 3 input of each of the set of muxes 1062 to select each data 3 input whenever the operation is a left-shift of a quadword. Each bit of the second most significant word of the decoded bus 938 is coupled to a corresponding data input 3 of each of the set of muxes 1062 in reverse order. For example, the three most significant bits of the fixdata bus 935 would indicate that the three least significant bits of the second most significant word of the shift output bus 919 (referring to FIG. 9) should be replaced for a lsq with a shift count of 35. The left shift shifts through the least significant doubleword before it begins to effect the second most significant word.

The lsw bus 1000, the rsw bus 1004, the rsdq bus 1010, and the lsq bus 1011 are coupled to a NOR gate 1014 which drives a zero bus 1018. The zero bus 1018 is coupled to the control 0 (c0) input of each of the set of muxes 1062 to force a zero on all the bits of the fixdata bus 935 when none of the select inputs are active. In addition the NOR bus 939 is coupled to the control 1 (c1) input of each of the muxes to force a one on all the bits of the fixdata bus 935 when at least one of the most-significant bits on the overflow shift count bus 904 is non-zero. This forces all the bits of the shifted packed intermediate result on the shift output bus 719 to be replaced.

Each of a set of muxes 1063 drives a bit of the fixdata bus 934 to indicate which bits of the most significant word of the shift output bus 919 (referring to FIG. 9) should be replaced. The lsw# bus 1000 is coupled to the select 0 input of each of the set of muxes 1063 to select each data 0 input whenever the operation is a left-shift of a word. Each bit of the least significant word of the decoded bus 938 is coupled to a corresponding data input 0 of each of the set of muxes 1063. For example, the three least significant bits of the fixdata bus 934 would indicate that the three least significant bits of the most significant word of the shift output bus 919 (referring to FIG. 9) should be replaced for a lsw with a shift count of 3. The lsd# bus 1047 is coupled to the select 1 input of each of the set of muxes 1063 to select each data 1 input whenever the operation is a left-shift of a doubleword. Each bit of the least significant word of the decoded bus 938 is coupled to a corresponding data input 1 of each of the set of muxes 1063. For example, the three least significant bits of the fixdata bus 934 would indicate that the three least significant bits of the most significant word of the shift output bus 919 (referring to FIG. 9) should be replaced for a lsd with a shift count of 19. The left shift shifts through the second least significant word before it begins to effect the most significant word. The rswdq# bus 1048 is coupled to the select 2 input of each of the set of muxes 1063 to select each data 2 input whenever the operation is a right-shift of a word, doubleword, or quadword. Each bit of the least significant word of the decoded bus 938 is coupled to a corresponding data input 2 of each of the set of muxes 1063 in reverse order. For example, the three most significant bits of the fixdata bus 934 would indicate that the three least significant bits of the most significant word of the shift output bus 919 (referring to FIG. 9) should be replaced for a rswdq with a shift count of 3. The lsq# bus 1045 is coupled to the select 3 input of each of the set of muxes 1063 to select each data 3 input whenever the operation is a left-shift of a quadword. Each bit of the most significant word of the decoded bus 938 is coupled to a corresponding data input 3 of each of the set of muxes 1060. For example, the three most significant bits of the fixdata bus 934 would indicate that the three least significant bits of the most significant word of the shift output bus 919 (referring to FIG. 9) should be replaced for a lsq with a shift count of 51. The left shift shifts through the least significant 48 bits of the quadword before it begins to effect the most significant word.

The lsw bus 1000, the lsd bus 1007, the rswdq bus 1008, and the lsq bus 1011 are coupled to a NOR gate 1015 which drives a zero bus 1019. The zero bus 1019 is coupled to the control 0 (c0) input of each of the set of muxes 1063 to force a zero on all the bits of the fixdata bus 934 when none of the select inputs are active. In addition the NOR bus 939 is coupled to the control 1 (c1) input of each of the muxes to force a one on all the bits of the fixdata bus 934 when at least one of the most-significant bits on the overflow shift count bus 904 is non-zero. This forces all the bits of the shifted packed intermediate result on the shift output bus 719 to be replaced.

While FIG. 10 illustrates one circuit for implementation of the fixshift circuit 932 of FIG. 9, any number of alternative fixshift circuits could be used.

Barrel Shifter

Figure 11:
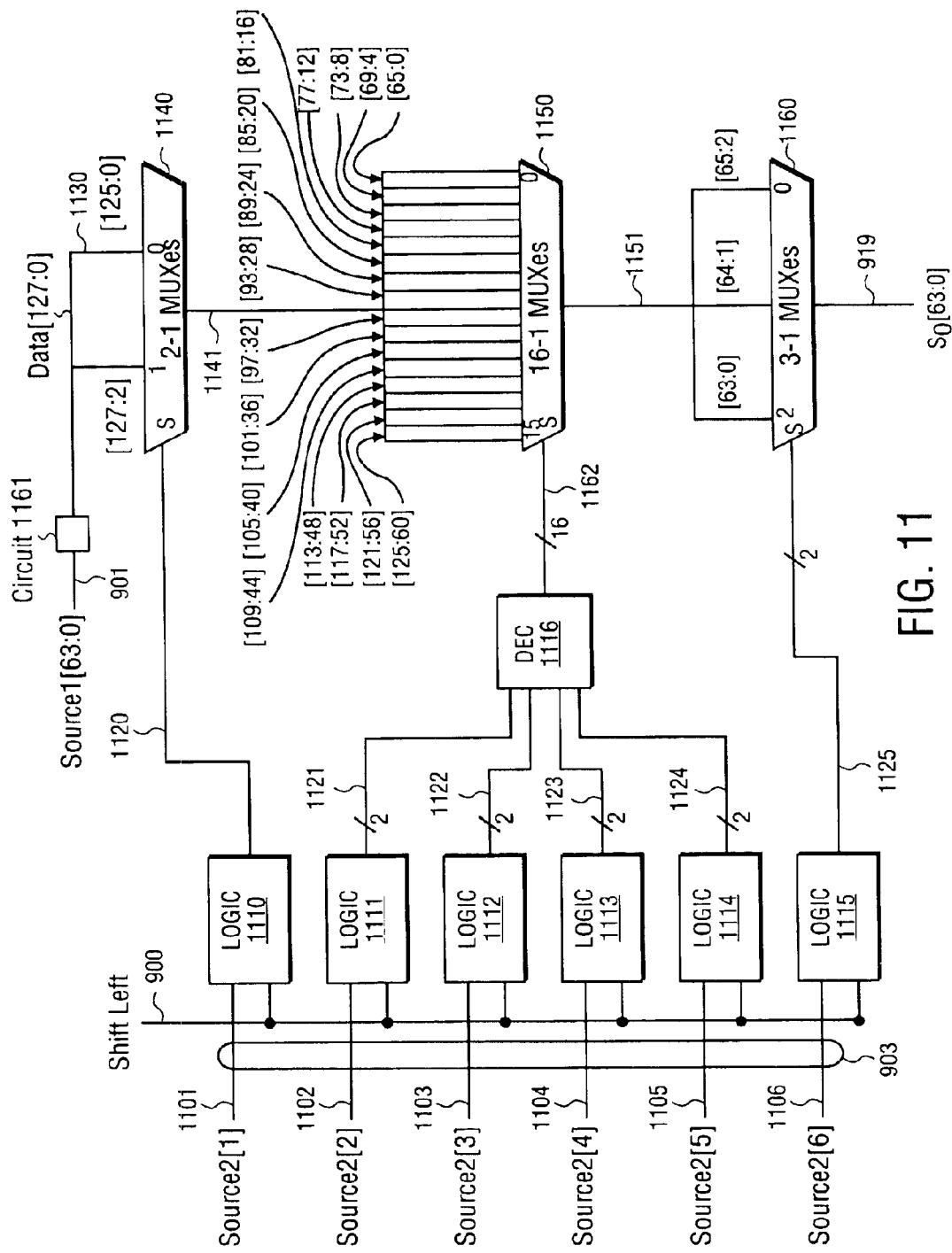
FIG. 11 illustrates an embodiment of a barrel shifter.

FIG. 11 illustrates one embodiment of the barrel shifter 905 (referring to FIG. 9). The barrel shifter 905 is implemented to perform right shifts. In order to perform left shifts, a right shift of the two's complement of the right shift count is performed according to well-known methods. The actual shift count bus 903 comprises an Source2[0] bus 1100, an Source2[1] bus 1101, an Source2[2] bus 1102, an Source2[3] bus 1103, an Source2[4] bus 1104, and an Source2[5] bus 1105. The Source2[1] bus 1101 and the shift left bus 900 are coupled to logic 1110 which generates a signal on select bus 1120 that is the value of Source2[1] when the operation is a right shift and the complement of Source2[1] when the operation is a left shift. The select bus 1120 is coupled to the select input of a set of 2-1 Muxes 1140. The Source1[63:0] bus 901 is coupled to circuit 1161 which replicates the 64-bit data to produce a 128-bit data (where one copy of the 64-bit data is in the most significant quadword and the other is in the least significant quadword) on the data[127:0] bus 1130.

In one embodiment, the circuit 1161 is simply wires that branch each single bit input to two output bits at the appropriate bit positions. Each bit of the data[127:2] portion of the data[127:0] bus 1130 is coupled to each corresponding 1 input of the set of 2-1 Muxes 1140. Each bit of the data[125:0] portion of the data[127:0] bus 1130 is coupled to each corresponding 0 input of the set of 2-1 Muxes 1140. The set of 2-1 Muxes 1140 are coupled to corresponding bits of an intermediate result bus 1141. When the select bus 1120 is driven high, data [127:2] is driven onto the intermediate result bus 1141 thereby shifting the data by two positions. When the select bus 1120 is driven low, data [125:0] is driven onto the intermediate result bus 1141.

The next stage of the barrel shifter 905 shifts the data on the intermediate result bus 1141 by 0, 4, 8, 12, 16, 20, 24, 28, 32, 36, 40, 44, 48, 52, 56, or 60 positions depending on the value of the bits on the Source2[2] bus 1102, the Source2[3] bus 1103, the Source2[4] bus 1104 and the Source2[5] bus 1105. The Source2[2] bus 1102 is coupled to logic 1111 (described in more detail below) which drives the two bits of the bitpair bus 1121. The first bit is Source2[2] when the operation is a right shift and the complement of Source2[2] when the operation is a left shift. The second bit is the complement of the first bit. The Source2[3] bus 1103, the Source2[4] bus 1104, and the Source2[5] bus 1105 are coupled to logic circuits 1112–1114, respectively, which drive bitpair busses 1122–1124, respectively, in a similar manner. The bitpair busses 1121–1124 are coupled to the inputs of decoder 1116 that generates a decoded value of the bitpair busses 1121–1124 on the select bus 1162 according to well-known methods. Each bit of the intermediate result [65:0] portion of the intermediate result bus 1141 is coupled to the 0 inputs of the corresponding one of the set of 16-1 Muxes 1150. Each bit of the intermediate result [69:4] portion of the intermediate result bus 1141 is coupled to the 1 inputs of the corresponding one of the set of 16-1 Muxes 1150. Each bit of the intermediate result [125:60] portion of the intermediate result bus 1141 is coupled to the 15 inputs of the corresponding one of the set of 16-1 Muxes 1150. The 2 inputs through the 14 inputs are coupled in a manner according to the pattern illustrated in FIG. 11 and described above. The set of muxes 1150 drive an intermediate result bus 1151 according to the input selected by the decoded value on the select bus 1162.

The last stage of the barrel shifter 905 shifts the data on the intermediate result bus 1151 by 0, 1, or 2 positions according to the value on the Source2[0] bus 1100 and the shift left bus 900. The Source2[0] bus 1100 and the shift left bus 900 are coupled to the inputs of a logic circuit 1115 which drives the select bus 1125. The logic circuit 1115 adds the values of the bits on the Source2[0] bus 1100 and the shift left bus 900 and drives the decoded sum on the select bus 1125 according to well-known methods. The select bus 1125 is coupled to a set of 3-1 Muxes 1160. Each bit of the intermediate result [63: 0] portion of the intermediate result bus 1151 is coupled to the 0 inputs of the corresponding one of the set of 3-1 Muxes 1160. Each bit of the intermediate result [64: 1] portion of the intermediate result bus 1151 is coupled to the 1 inputs of the corresponding one of the set of 3-1 Muxes 1160. Each bit of the intermediate result [65: 2] portion of the intermediate result bus 1151 is coupled to the 2 inputs of the corresponding one of the set of 3-1 Muxes 1160. Each of the set of 3-1 Muxes 1160 drives the corresponding bit of the result on the shifted output bus 919 according to the input selected by the decoded sum on the select bus 1125.

While FIG. 10 illustrates one circuit for implementation of the fixshift circuit 932 of FIG. 8, any number of alternative fixshift circuits could be used.

Encoding Logic

Figure 12:
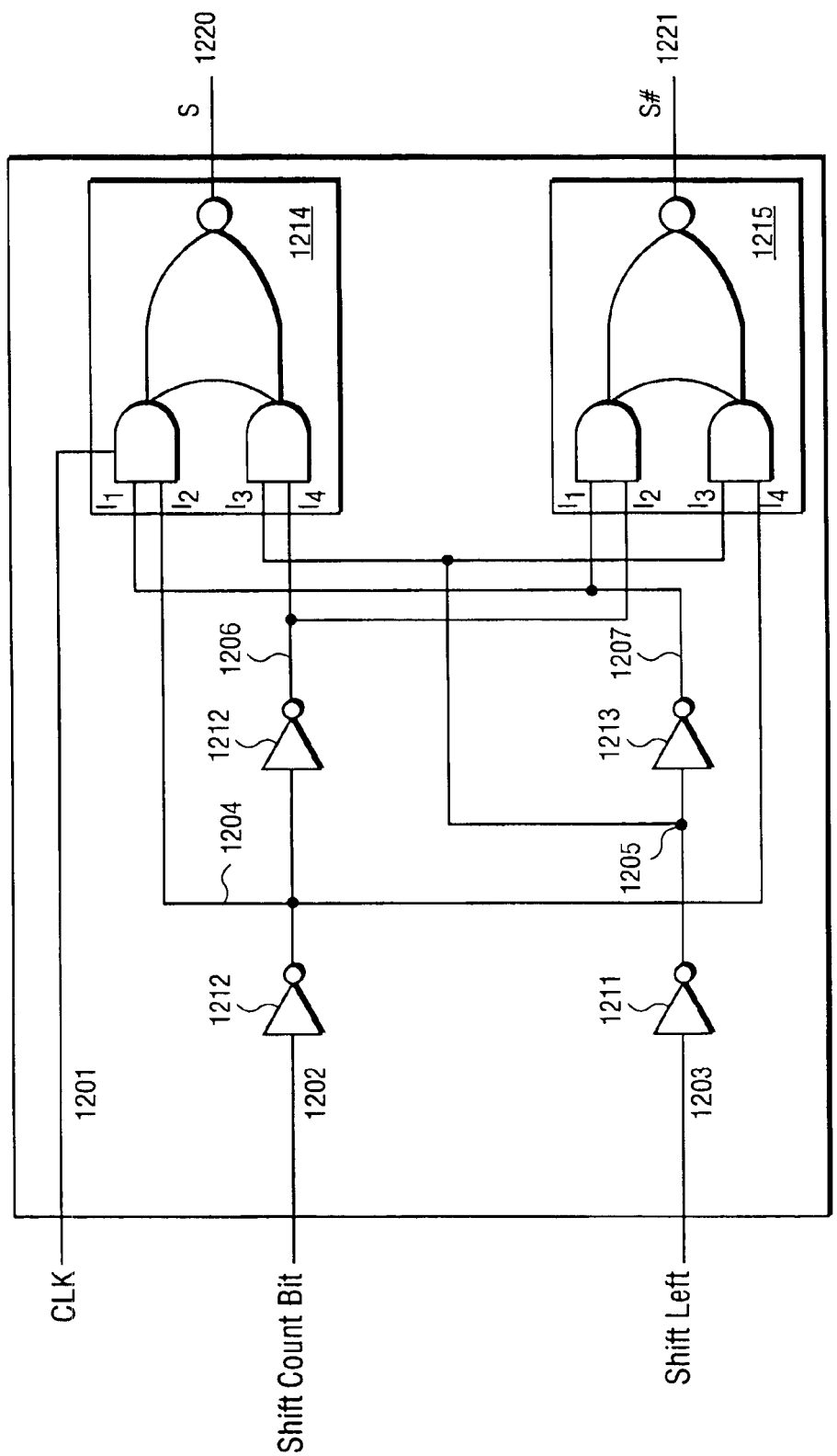
FIG. 12 illustrates an embodiment of a mux for a barrel shifter.

FIG. 12 illustrates one embodiment of the encoding logic represented in FIG. 11 as each of the logic circuits 1111–1114. A shift count bit is driven onto the S bus 1220 (which corresponds to each of the first bit of a bitpair bus as described above) and the complement of the shift count bit is driven onto the S# bus (which corresponds to the second bit of a bitpair bus as described above) when the shift left bus 1203 indicates that the operation is a right shift. The complement of the shift count bit is driven onto the S bus 1220 and the shift count bit is driven onto the S# bus when the shift left bus 1203 indicates that the operation is a left shift.

The shift count bit is driven on a shiftcount bit bus 1202 which is coupled to the input of an inverter 1210. Inverter 1210 drives the complement of the shift count bit on the shiftcount bit# bus 1204 which is coupled to the input of an inverter 1212. Inverter 1212 drives the bit to be encoded on a delayed shiftcount bit bus 1206. The shift left bus 1203 is coupled to the input of inverter 1211 which drives the complement of the shift left signal on the shift left# bus 1205. The shift left# bus 1205 is coupled to an inverter 1213 which drives the delayed shift left bus 1207.

The shiftcount bit# bus 1204 is coupled to the first input of complex gate 1214 and the fourth input of complex gate 1215. The delayed shiftcount bus 1206 is coupled to the fourth input of complex gate 1214 and the second input of complex gate 1215. The shift left# bus 1205 is coupled to the third input of complex gate 1214 and the third input of complex gate 1215. The delayed shift left bus 1207 is coupled to the first input of complex gate 1214 and the first input of complex gate 1215.

Table 7 is the truth table for both complex gate 1214 and complex gate 1215. The output is false whenever either the first two inputs are true or the second two inputs are true. Otherwise, the output is false. The implementation of this logic as a complex gate improves performance. This is particularly important since the logic decodes 4 bits for the second stage of this 64-bit barrel shifter as compared to 3 bits for the second stage in a 32-bit barrel shifter.

TABLE 7

Complex Gate Truth Table

| First Input | Second Input | Third Input | Fourth Input | OUT |
|---|---|---|---|---|
| 0 | 0 | 0 | 0 | 1 |
| 0 | 0 | 0 | 1 | 1 |
| 0 | 0 | 1 | 0 | 1 |
| 0 | 0 | 1 | 1 | 0 |
| 0 | 1 | 0 | 0 | 1 |
| 0 | 1 | 0 | 1 | 1 |
| 0 | 1 | 1 | 0 | 1 |
| 0 | 1 | 1 | 1 | 0 |
| 1 | 0 | 0 | 0 | 1 |
| 1 | 0 | 0 | 1 | 1 |
| 1 | 0 | 1 | 0 | 1 |
| 1 | 0 | 1 | 1 | 0 |
| 1 | 1 | 0 | 0 | 0 |
| 1 | 1 | 0 | 1 | 0 |
| 1 | 1 | 1 | 0 | 0 |
| 1 | 1 | 1 | 1 | 0 |

Method of Performing a Packed Shift Operation

Figure 13:
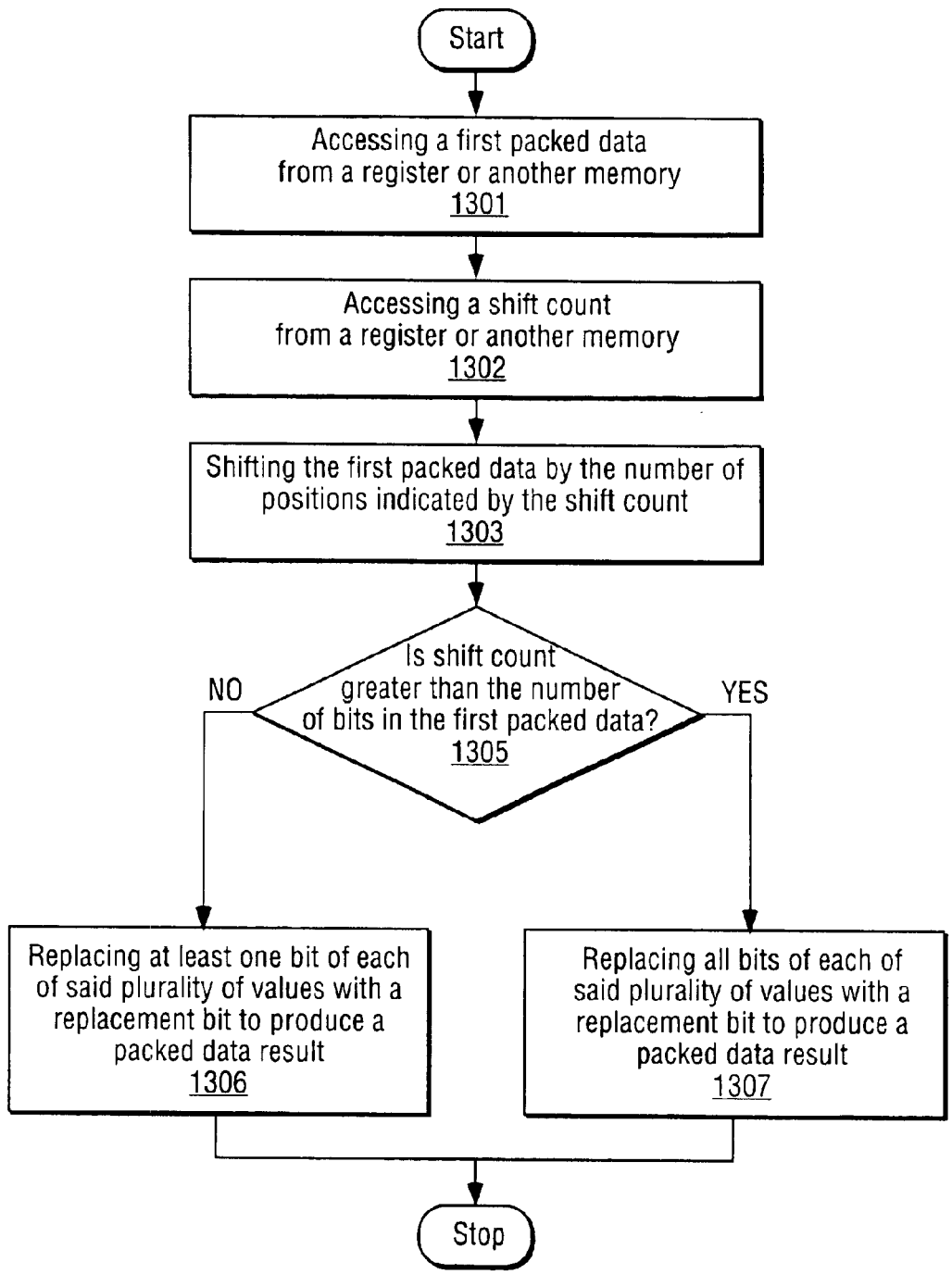
FIG. 13 illustrates another embodiment of a method of performing a packed shift operation.

FIG. 13 illustrates one embodiment of a method of performing a Packed Shift Operation.

In Step 1301, a first packed data is accessed from a register or another memory, such as RAM, a cache memory, a flash memory, or other data storage device. The first packed data represents multiple values to be shifted.

In Step 1302, a shift count is accessed from a register or another memory. The shift count represents the number of positions each value of the first packed data is to be shifted.

In Step 1303, the first packed data is shifted by the number of positions indicated by the shift count to produce an shifted packed intermediate result. In one embodiment, portions of some values of the shifted packed intermediate result may be shifted into other values of the shifted packed intermediate result.

In Step 1305, the correction circuit determines whether the shift count is greater than the number of bits to be shifted in the first packed data. If so, Step 1306 is performed. If not Step 1307 is performed.

In Step 1306, all the bits of the shifted packed intermediate data is replaced by the corresponding replacement bit. This produces a result that is consistent with a first packed data having values that are extended beyond the most significant and least significant bits represented. If such a value is shifted by greater than the number of bits represented, the sign bit (for right arithmetic shifts) or the zero bits (for logical shifts) should replace the whole value.

In Step 1307, at least one bit of the shifted packed intermediate data is replaced by the corresponding replacement bit. In one embodiment, the replacement bits correspond to those bits in those portions of the values of the shifted packed intermediate result that are shifted into other values of the shifted packed intermediate result.

Although a great deal of detail has been included in the description and figures, the invention is defined by the scope of the claims. Only limitations found in the claims are considered essential to the invention.

What is claimed is:

1. An apparatus comprising:
   a storage area to hold a first source data having a plurality of data elements;
   a functional unit to perform operations specified by a packed data instruction set having a format identifying the first source data and a second source data, wherein said packed data instruction set specifies operations including one or more packed shift type operations, said funtional unit including:
   a shifter circuit to shift the first source data in response to the one or more packed shift type operations; and
   a correction circuit to generate a corresponding replacement digit for each data element of the plurality of data elements, the correction circuit coupled to the shifting circuit to produce a result packed data comprising, as separate result elements, said first source data having each data element shifted by an amount specified by said second source data with said amount of bits for each data element filled, if needed, with the corresponding replacement digit.

2. The apparatus of claim 1 wherein said one or more packed shift type operations include:
   one or more packed shift right arithmetic type operations that each cause said result packed data to comprise, as separate result elements, said first source data having each data element shifted to the right said amount specified by said second source data with high order bits filled, if needed, with a sign value;
   one or more packed shift left type operations that each cause said result packed data to comprise, as separate result elements, said first source data having each data element shifted to the left said amount specified by said second source data with low order bits filled, if needed, with a zero; and
   one or more packed shift right logical type operations that each cause said result packed data to comprise, as separate result elements, said first source data having each data element shifted to the right said amount specified by said second source data with high order bits filled, if needed, with a zero.

3. The apparatus of claim 1 wherein the packed data instruction set has a format permitting a first three-bit source-destination address and a second three-bit source address identifying the first source data and the second source data respectively.

4. The apparatus of claim 3 wherein bits three through five of said format correspond to the first three-bit source-destination address and bits zero through two of said format correspond to the second three-bit source address.

5. The apparatus of claim 1 wherein the packed data instruction set has a format permitting a first byte to include a first three-bit source-destination address identifying the first source data and a second three-bit opcode extension identifying the second source data as an immediate value following said first byte.

6. The apparatus of claim 5 wherein bits zero through two of said first byte correspond to the first three-bit source-destination address and bits three through five of said first byte correspond to the second three-bit opcode extension.

7. The apparatus of claim 1 wherein the packed data instruction set has a format permitting register by memory addressing to identify the first source data and the second source data respectively.

8. The apparatus of claim 1 wherein the packed data instruction set has a format permitting an operation code to specify one or more packed shift operations to perform an arithmetic right shift of word elements or of doubleword elements from the first packed data.

9. The apparatus of claim 8 wherein the one or more packed shift operations to perform the arithmetic right shift causes each result data element to be filled with a corresponding sign value when the second source data represents a value greater than fifteen for packed word elements or a value greater than thirty-one for packed doubleword elements.

10. The apparatus of claim 1 wherein the packed data instruction set has a format permitting an operation code to specify one or more packed shift operations to perform a logical right shift of word elements or of doubleword elements from the first packed data.

11. The apparatus of claim 10 wherein the one or more packed shift operations to perform the logical right shift causes each result data element to be filled with a zero value when the second source data represents a value greater than fifteen for packed word elements or greater than thirty-one for packed doubleword elements.

12. A method comprising:
accessing a first source data having a plurality of data elements from a first storage area;
accessing a second source data from a second storage area; and
enabling a functional unit to perform a packed shift operation specified by a packed data instruction having a format identifying the first source data and the second source data, wherein performing said packed shift operation includes:
shifting the first packed data in response to the packed shift operation, and
generating a replacement value for each data element of the plurality of data elements, to produce a result packed data comprising, as separate result elements, said first source data having each data element shifted by an amount specified by said second source data with said amount of bits for each data element filled, if needed, with the corresponding replacement value.

13. The method of claim 12 wherein said packed shift operation is one of a set of packed shift right arithmetic type operations that each cause said result packed data to comprise, as separate result elements, said first source data having each data element shifted to the right said amount specified by said second source data with high order bits filled, if needed, with a sign value.

14. The method of claim 12 wherein said packed shift operation is one of a set of one or more packed shift left type operations that each cause said result packed data to comprise, as separate result elements, said first source data having each data element shifted to the left said amount specified by said second source data with low order bits filled, if needed, with a zero.

15. The method of claim 12 wherein said packed shift operation is one of a set of one or more packed shift right logical type operations that each cause said result packed data to comprise, as separate result elements, said first source data having each data element shifted to the right said amount specified by said second source data with high order bits filled, if needed, with a zero.

16. The method of claim 12 wherein performing said packed shift operation further includes replacing all bits of each data element of said first source data with the corresponding replacement value if the amount specified by said second source data is greater than the number of bits in each data element.

17. The method of claim 12 wherein the packed data instruction has a format including a first three-bit source-destination address and a second three-bit source address identifying the first source data and the second source data respectively.

18. The method of claim 17 wherein bits three through five of said format correspond to the first three-bit source-destination address and bits zero through two of said format correspond to the second three-bit source address.

19. The method of claim 12 wherein the packed data instruction format has a first byte to include a first three-bit source-destination address identifying the first source data and a second three-bit opcode extension identifying the second source data as an immediate value following said first byte.

20. The method of claim 19 wherein bits zero through two of said first byte correspond to the first three-bit source-destination address and bits three through five of said first byte correspond to the second three-bit opcode extension.

21. The method of claim 12 wherein the packed data instruction has a format permitting register by memory addressing to identify the first source data and the second source data respectively.

22. The method of claim 12 wherein the packed data instruction specifies the packed shift operation to perform an arithmetic right shift on word elements or doubleword elements from the first packed data.

23. The method of claim 12 wherein the packed data instruction specifies the packed shift operation to perform a logical right shift of word elements or of doubleword elements from the first packed data.

24. An article of manufacture comprising:
a machine-accessible medium including data that, when accessed by a machine, causes the machine to perform the method of claim 12.

25. An article of manufacture comprising:
a machine-accessible medium including design data suitable to at least one process technology, said design data to implement an apparatus to perform the method of claim 12.

26. A system comprising:

a memory to hold a plurality of data elements;

a processor to perform operations specified by a packed data instruction set having a format identifying a first source data and a second source data, wherein said packed data instruction set specifies operations including one or more packed shift type operations, said processor including:
- a storage area to store the plurality of data elements as the first source data;
- a shifter circuit to shift the first source data in response to the one or more packed shift type operations; and
- a correction circuit to generate a corresponding replacement digit for each data element of the plurality of data elements, the correction circuit coupled to the shifting circuit to produce a result packed data comprising, as separate result elements, said first source data having each data element shifted by an amount specified by said second source data with said amount of bits for each data element filled, if needed, with the corresponding replacement digit;

a bus coupled with the processor to transmit data to and from the processor and to and from the memory; and an interface to couple the bus with one or more devices to provide data to or receive data from the bus, said one or more devices comprising an audio device selected from the group consisting of an audio digitizing device, a sound recording device, a sound playback device, a microphone, a digital-to-analog converter, and a speaker.

27. The system of claim 26 wherein said one or more packed shift type operations include:

one or more packed shift right arithmetic type operations that each cause said result packed data to comprise, as separate result elements, said first source data having each data element shifted to the right said amount specified by said second source data with high order bits filled, if needed, with a sign value;

one or more packed shift left type operations that each cause said result packed data to comprise, as separate result elements, said first source data having each data element shifted to the left said amount specified by said second source data with low order bits filled, if needed, with a zero; and one or more packed shift right logical type operations that each cause said result packed data to comprise, as separate result elements, said first source data having each data element shifted to the right said amount specified by said second source data with high order bits filled, if needed, with a zero.

28. The system of claim 26 further comprising:

a storage device to store a plurality of instruction sequences including instructions of the packed data instruction set, said storage device to couple with the bus to transmit instructions to the processor and to the memory, wherein the plurality of instruction sequences include at least an instruction sequence to manipulate audio.

29. The system of claim 26 further comprising:

a storage device to store a plurality of instruction sequences including instructions of the packet data instruction set, said storage device to couple with the bus to transmit instructions to the processor and to the memory, wherein the plurality of instruction sequences include at least an instruction sequence to perform voice recognition.

* * * * *

UNITED STATES PATENT AND TRADEMARK OFFICE
CERTIFICATE OF CORRECTION

PATENT NO. : 6,901,420 B2
DATED : May 27, 2005
INVENTOR(S) : Lin et al.

It is certified that error appears in the above-identified patent and that said Letters Patent is hereby corrected as shown below:

Drawings,
Figure 6A, delete "6A FIG." and insert -- FIG. 6A --.
FIG. 6A, delete "SZ" between boxes 603 and 610, and insert -- SZ -- in box 610.
FIG. 6A, delete "T" between boxes 610 and 611, and insert -- T -- in box 611.
FIG. 6A, delete "S" between boxes 611 and 612, and insert -- S -- in box 612.

Signed and Sealed this

Sixth Day of September, 2005

JON W. DUDAS
*Director of the United States Patent and Trademark Office*